(12) United States Patent
Watanabe et al.

(10) Patent No.: US 10,934,968 B2
(45) Date of Patent: Mar. 2, 2021

(54) ENGINE COOLING STRUCTURE

(71) Applicant: Mazda Motor Corporation, Hiroshima (JP)

(72) Inventors: Shinji Watanabe, Hiroshima (JP);
Tatsuya Takahata, Hiroshima (JP);
Yoshiaki Hayamizu, Higashihiroshima (JP); Keita Watanabe, Hiroshima (JP);
Mikimasa Kawaguchi, Higashihiroshima (JP)

(73) Assignee: Mazda Motor Corporation, Hiroshima (JP)

(*) Notice: Subject to any disclaimer, the term of this patent is extended or adjusted under 35 U.S.C. 154(b) by 0 days.

(21) Appl. No.: 16/738,172

(22) Filed: Jan. 9, 2020

(65) Prior Publication Data
US 2020/0232413 A1 Jul. 23, 2020

(30) Foreign Application Priority Data
Jan. 17, 2019 (JP) .............................. JP2019-006067

(51) Int. Cl.
*F02F 1/14* (2006.01)
*F02F 1/10* (2006.01)
*F02F 7/00* (2006.01)

(52) U.S. Cl.
CPC ............... *F02F 1/14* (2013.01); *F02F 1/108* (2013.01); *F02F 7/007* (2013.01); *F02F 2001/104* (2013.01)

(58) Field of Classification Search
CPC ........ F01P 3/14; F01P 5/10; F01P 3/02; F02F 1/14
See application file for complete search history.

(56) References Cited

U.S. PATENT DOCUMENTS

| 2015/0345363 A1 | 12/2015 | Marutani et al. |
| 2015/0377114 A1* | 12/2015 | Matsumoto ............... F01P 3/20 123/41.44 |

(Continued)

FOREIGN PATENT DOCUMENTS

| DE | 112014000928 T5 | 11/2015 |
| DE | 102015006786 A1 | 12/2015 |

(Continued)

OTHER PUBLICATIONS

European Patent Office, Extended European Search Report Issued in Application No. 20150494.1 dated Jun. 16, 2020, Germany, 7 pages.

(Continued)

*Primary Examiner* — Kevin A Lathers
(74) *Attorney, Agent, or Firm* — Alleman Hall Creasman & Tuttle LLP

(57) ABSTRACT

An engine cooling structure includes a cylinder block including a block inner peripheral wall that defines a water jacket and a block outer peripheral wall, a spacer housed in the water jacket, and a cooler provided outside the engine body. The spacer includes: a peripheral wall surrounding the block inner peripheral wall; and a dividing wall protruding from the peripheral wall to divide the water jacket into an upper passage and lower passages below the upper passage. A coolant introduced from a coolant inlet into the upper passage passes through an inter-bore part of the block inner peripheral wall. The coolant in the lower passages is introduced into the cooler through a coolant exit.

8 Claims, 19 Drawing Sheets

(56) References Cited

U.S. PATENT DOCUMENTS

| | | |
|---|---|---|
| 2016/0010533 A1 | 1/2016 | Matsumoto et al. |
| 2017/0067411 A1 | 3/2017 | Doho et al. |
| 2017/0298858 A1 | 10/2017 | Mori et al. |
| 2017/0298860 A1* | 10/2017 | Mori .................. F01P 3/02 |
| 2017/0350302 A1 | 12/2017 | Araki et al. |

FOREIGN PATENT DOCUMENTS

| | | |
|---|---|---|
| JP | S556433 U | 1/1980 |
| JP | H07127520 A | 5/1995 |
| JP | 2015108345 A | 6/2015 |
| JP | 2015108346 A | 6/2015 |
| JP | 2015190403 A | 11/2015 |
| JP | 2016121578 A | 7/2016 |
| JP | 2018123742 A | 8/2018 |

OTHER PUBLICATIONS

European Patent Office, Extended European Search Report Issued in Application No. 20150495.8, dated May 20, 2020, Germany, 8 pages.

\* cited by examiner

ENGINE COOLING STRUCTURE

CROSS-REFERENCE TO RELATED APPLICATION

This application is based on Japanese Patent application No. 2019-006067 filed in Japan Patent Office on Jan. 17, 2019, the contents of which are hereby incorporated by reference.

TECHNICAL FIELD

The present invention relates to a structure for cooling an engine body including a plurality of cylinders by using a coolant.

BACKGROUND ART

An engine provided in a vehicle or the like includes an engine body including a plurality of cylinders, and a cooler that cools a cooling object such as a lubricant that lubricates an interior of the engine body. For example, Japanese Patent Application Laid-Open No. 2015-108345 discloses an engine including an oil cooler that cools a lubricating oil and an EGR cooler that cools an EGR gas.

In the engine disclosed in Japanese Patent Application Laid-Open No. 2015-108345, a coolant that circulates inside a cylinder block is led out from the cylinder block and introduced into the oil cooler and the EGR cooler. In other words, the oil cooler and the EGR cooler cool the oil and the EGR gas with the coolant after cooling the cylinder block. With this configuration, since the oil and the EGR gas are cooled by using the coolant for cooling the cylinder block, it is unnecessary to separately prepare another coolant for cooling the oil and the EGR gas, and the structure of the engine can be simplified.

However, the engine of Japanese Patent Application Laid-Open No. 2015-108345 is designed such that the coolant after cooling the cylinder block is distributed to the oil cooler and the EGR cooler outside the cylinder block. Therefore, when a flow rate of the coolant to be introduced into the cylinder block is reduced in order to keep each cylinder (combustion chamber) of the engine body warm, the flow rate of the coolant to be introduced into the oil cooler or the EGR cooler is also reduced accordingly.

SUMMARY OF INVENTION

The present invention has been made in view of the above circumstances, and an object of the present invention is to provide an engine cooling structure that can introduce an appropriate amount of coolant into the cooler while adjusting the combustion chamber of the engine body at an appropriate temperature.

An engine cooling structure according to the present invention for solving the above problem is a structure for cooling an engine body including a plurality of cylinders by using a coolant, and includes: a cylinder block including: a block inner peripheral wall defining the plurality of cylinders; and a block outer peripheral wall surrounding the block inner peripheral wall to define a water jacket through which the coolant circulates between the block outer peripheral wall and the block inner peripheral wall; a spacer housed in the water jacket; and a cooler provided outside the engine body. The block outer peripheral wall includes: a coolant inlet configured to introduce the coolant into the water jacket; and a coolant exit configured to lead out the coolant from the water jacket to the cooler. The block inner peripheral wall includes an inter-bore part positioned between the adjacent cylinders. The spacer includes: a peripheral wall surrounding the block inner peripheral wall; and a dividing wall protruding from the peripheral wall to divide the water jacket into an upper passage and a lower passage below the upper passage. The coolant inlet is provided at a position to introduce the coolant into the upper passage, and the upper passage allows the coolant introduced from the coolant inlet to pass through the inter-bore part. The coolant exit is provided at a position to lead out the coolant in the lower passage to the cooler, and the cooler cools a predetermined cooling object by the coolant led out from the coolant exit.

DESCRIPTION OF EMBODIMENT

An engine cooling structure according to an embodiment of the present invention will be described below with reference to the drawings.

(1) Overall Configuration

Figure 1:
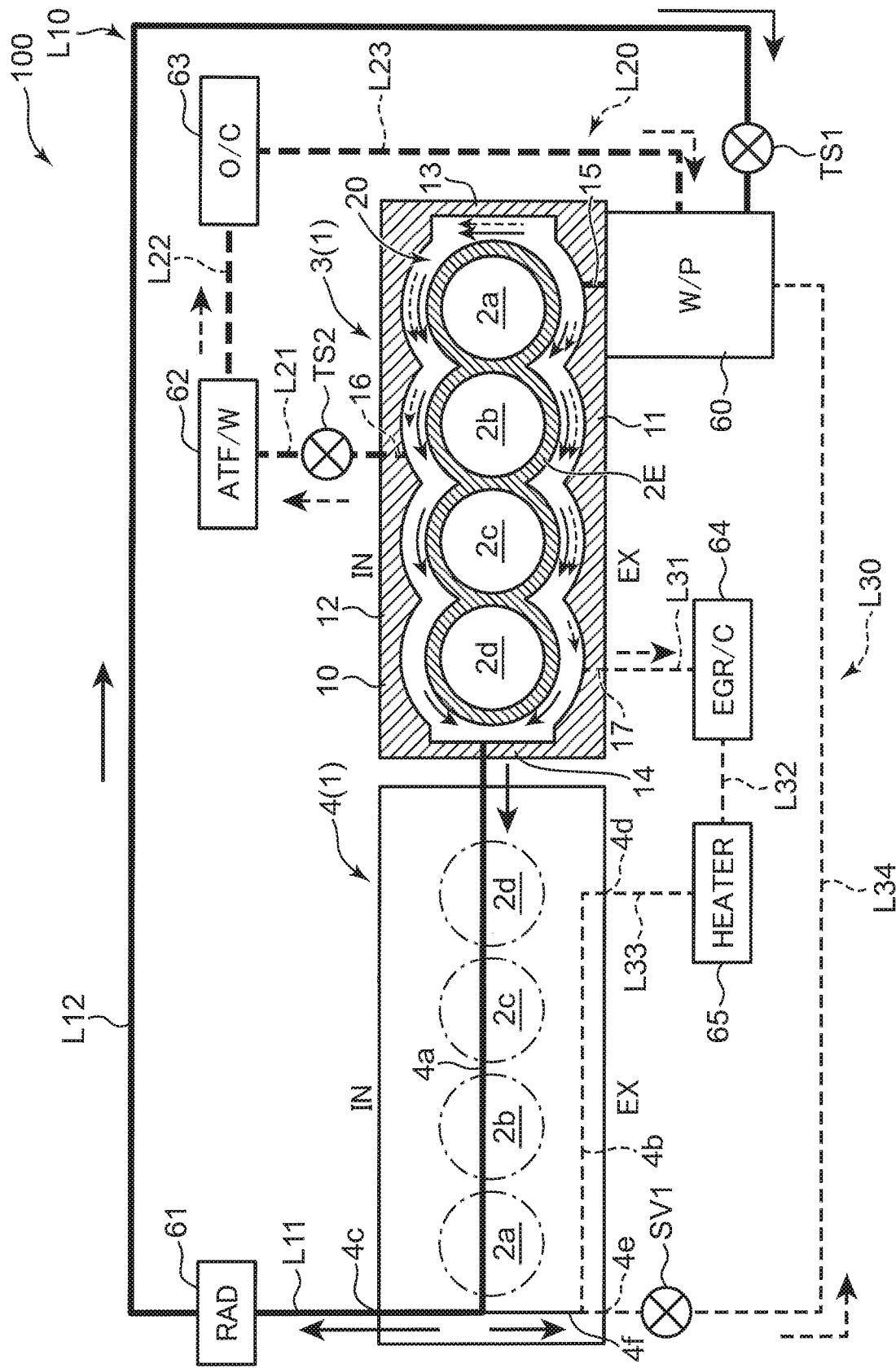
FIG. 1 is a schematic diagram showing an overall configuration of an engine system according to an embodiment of the present invention.

FIG. 1 is a schematic diagram showing a preferred embodiment of an engine system to which the cooling structure of the present invention is applied. An engine system 100 includes an engine body 1, a water pump 60, a radiator (RAD) 61, an automatic transmission fluid warmer (ATF/W) 62, an oil cooler (O/C) 63, an exhaust gas recirculation cooler (EGR/C) 64, and a heater 65. In the present embodiment, the oil cooler 63 and the EGR cooler 64 correspond to the "cooler" of the claims. The oil cooler 63 corresponds to the "second cooler" of the claims, and the EGR cooler 64 corresponds to the "first cooler" of the claims.

As shown in FIG. 1, the engine body 1 is a series four-cylinder type four-cycle engine including four substantially cylindrical cylinders 2a to 2d arranged in a predetermined direction. The engine body 1 is mounted on a vehicle as a drive source for rotationally driving wheels. The engine body 1 includes a cylinder block 3 in which the cylinders 2a to 2d are formed, and a cylinder head 4 fastened to the cylinder block 3 covering a top surface of the cylinder block 3. In each of the cylinders 2a to 2d, a piston (not shown) is fitted to allow up-and-down reciprocating motion. In each of the cylinders 2a to 2d, a crown surface of the piston and a bottom surface of the cylinder head 4 define a combustion chamber in which an air-fuel mixture burns. In the engine according to the present embodiment, auto-ignition combustion in which the air-fuel mixture is self-ignited is performed in at least a part of an operation region. Note that FIG. 1 shows the cylinder block 3 and the cylinder head 4 separate from each other.

Hereinafter, the four cylinders 2a to 2d formed in the cylinder block 3 are referred to as a first cylinder 2a, a second cylinder 2b, a third cylinder 2c, and a fourth cylinder 2d, respectively, in order from the right side of FIG. 1. Meanwhile, the first to fourth cylinders 2a to 2d, when referred to without particular distinction, are simply referred to as cylinders 2. As appropriate, a direction in which the cylinders 2 are arranged, that is, a cylinder row direction is referred to as a front-to-back direction, a direction from the fourth cylinder 2d to the first cylinder 2a is referred to as forward, and a direction from the first cylinder 2a to the fourth cylinder 2d is referred to as backward. Note that FIG. 1 shows that the cylinder head 4 is opposite to the cylinder block 3 in a front-to-back direction, and in the cylinder head 4, the fourth cylinder 2d is on the right side and the first cylinder 2a is on the left side.

In the cylinder head 4, an intake port (not shown) for introducing intake air into the cylinder 2 and an exhaust port (not shown) for discharging exhaust gas from the cylinder 2 are formed separately on a first side and a second side in a width direction of the engine body 1 orthogonal to the cylinder row direction across a central axis of the cylinder 2. Hereinafter, as appropriate, the width direction of the engine body 1 is referred to as a right-to-left direction, the side on which the intake port is formed is referred to as an intake side or left, and the opposite side is referred to as an exhaust side or right. In FIG. 1 and other figures, "EX" indicates the exhaust side, and "IN" indicates the intake side.

The water pump 60 is a device that discharges a coolant for cooling the engine body 1. A water jacket 20 through which the coolant can circulate is formed in the cylinder block 3. The water pump 60 introduces the coolant into the water jacket 20.

Specifically, the cylinder block 3 includes a block inner peripheral wall 2E that defines the four cylinders 2, and a block outer peripheral wall 10 surrounding the block inner peripheral wall 2E. The water jacket 20 is defined and formed between the block inner peripheral wall 2E and the block outer peripheral wall 10. A coolant-introducing hole 15 is formed in the block outer peripheral wall 10. The coolant-introducing hole 15 opens on an outer peripheral surface of the block outer peripheral wall 10 and communicates with the water jacket 20. The water pump 60 is fixed to the cylinder block 3 in communication with the coolant-introducing hole 15. The coolant discharged from the water pump 60 is introduced into the water jacket 20 via the coolant-introducing hole 15. In the present embodiment, the coolant-introducing hole 15 corresponds to the "coolant inlet" of the claims.

In the block outer peripheral wall 10, a first block side outlet hole 16 and a second block side outlet hole 17 are formed in addition to the coolant-introducing hole 15. Each of the outlet holes 16 and 17 opens on the outer peripheral surface of the block outer peripheral wall 10 and communicates with the water jacket 20. In the present embodiment, the first block side outlet hole 16 and the second block side outlet hole 17 correspond to the "coolant exit" of the claims. The first block side outlet hole 16 corresponds to the "second exit" of the claims, and the second block side outlet hole 17 corresponds to the "first exit" of the claims.

The radiator 61 is a device for cooling the coolant, and cools the coolant circulating inside by a running wind, a cooling fan, or the like of a vehicle.

Figure 2:
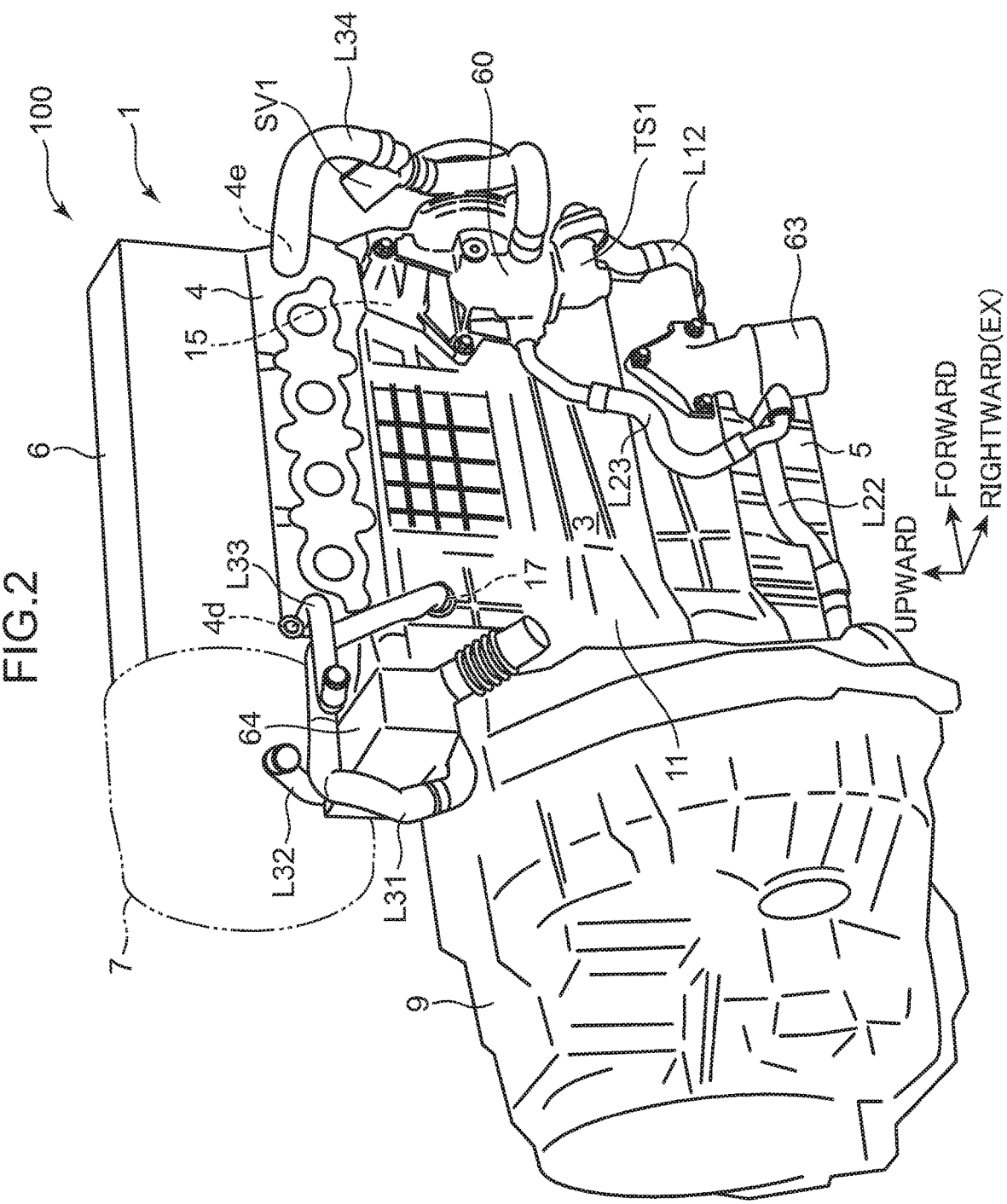
FIG. 2 is a perspective view of an engine body and peripheral devices thereof when viewed from an exhaust side.

The ATF warmer 62 is a device for warming automatic transmission fluid (ATF), which is a working oil for an automatic transmission 9 (see FIG. 2). That is, in the present embodiment, the automatic transmission 9 that transmits rotation of the engine body 1 to an axle while shifting the rotation is connected to the engine body 1. The ATF warmer 62 warms the ATF in the automatic transmission 9. In the ATF warmer 62, passages through which the ATF and the coolant circulate are formed. The ATF is heated by heat exchange between the ATF and the coolant circulating through the passages in the ATF warmer 62.

The oil cooler 63 is a device for cooling an engine oil, which is a lubricant for lubricating each part of the engine body 1. In the oil cooler 63, passages through which the engine oil and the coolant circulate are formed. The engine oil is cooled by heat exchange between the engine oil and the coolant circulating through the passages in the oil cooler 63.

The EGR cooler 64 is a device for cooling an EGR gas. That is, in the present embodiment, an EGR passage (not shown) that causes an exhaust passage (not shown) and an intake passage (not shown) connected to the engine body 1 to communicate with each other is provided in order to introduce a part of the exhaust gas discharged from the engine body 1 into the engine body 1. The EGR cooler 64 is provided in the EGR passage. The EGR cooler 64 cools the EGR gas, which is an exhaust gas recirculated to intake air (intake air to be introduced into the engine body 1) through the EGR passage. In the EGR cooler 64, passages through which the EGR gas and the coolant circulate are formed. The EGR gas is cooled by heat exchange between the EGR gas and the coolant circulating through the passages in the EGR cooler 64.

The heater 65 is a heater for heating (air conditioning) for introducing warm air into a vehicle interior or the like. In the heater 65, passages through which air and the coolant circulate are formed. The air is heated by heat exchange between the air and the coolant circulating through the passages in the heater 65.

In this way, the coolant cools the engine body 1 and performs heat exchange with an object fluid in each device. The engine system 100 is provided with a plurality of passages for circulating the coolant between the water pump 60, and the engine body 1 and each device. Specifically, the engine system 100 includes: a main passage L10 that circulates the coolant between the water pump 60 and the radiator 61; a first auxiliary passage L20 that circulates the coolant between the water pump 60, and the ATF warmer 62 and the oil cooler 63; and a second auxiliary passage L30 that circulates the coolant between the water pump 60, and the EGR cooler 64 and the heater 65.

The main passage L10 includes the coolant-introducing hole 15, the water jacket 20, a first head side jacket 4*a*, a radiator introduction passage L11, and a radiator outlet passage L12. The first head side jacket 4*a* is a passage (water jacket) formed in the cylinder head 4 and extending in a front-to-back direction. The radiator introduction passage L11 is a passage connecting the first head side jacket 4*a* and the radiator 61. The radiator outlet passage L12 is a passage connecting the radiator 61 and the water pump 60.

The first head side jacket 4*a* is formed to pass near the center of each cylinder 2. A rear end of the first head side jacket 4*a* and a rear end of the water jacket 20 communicate with each other in an up-and-down direction. The first head side jacket 4*a* opens on an intake side surface of a front end of the cylinder head 4, and the radiator introduction passage L11 is connected to an opening 4*c* (hereinafter referred to as a first head side outlet part 4*c*).

In the main passage L10, the coolant discharged from the water pump 60 flows into the water jacket 20 through the coolant-introducing hole 15, enters the first head side jacket 4*a* from a rear end of the water jacket 20, and then flows into the radiator introduction passage L11 through the first head side outlet part 4*c*. Thereafter, the coolant is cooled by the radiator 61 and returns to the water pump 60 again through the radiator outlet passage L12.

In the radiator outlet passage L12, a main switching device TS1 that opens and closes the radiator outlet passage L12 and thus the main passage L10 is provided. The main switching device TS1 includes a thermostat and a switching valve. When the temperature of the coolant circulating through the radiator outlet passage L12 is lower than a predetermined temperature, the switching valve of the main switching device TS1 is closed, and circulation of the coolant through the main passage L10 stops. On the other hand, when the temperature of the coolant circulating through the radiator outlet passage L12 is equal to or higher than the predetermined temperature, the switching valve of the main switching device TS1 is opened, and the coolant can circulate through the main passage L10. This predetermined temperature is set at about 95° C., for example. In the present embodiment, the predetermined temperature is changed based on a command from a power control module (PCM) provided in a vehicle. Note that the PCM is a device for controlling each part of the engine system 100, and as is well known, the PCM is a microprocessor including a central processing unit (CPU), a read-only memory (ROM), a random access memory (RAM), and the like.

The first auxiliary passage L20 includes the coolant-introducing hole 15, the water jacket 20, the first block side outlet hole 16, an ATF warmer introduction passage L21, an ATF warmer outlet passage L22, and an oil cooler outlet passage L23. The ATF warmer introduction passage L21 is a passage connecting the first block side outlet hole 16 and the ATF warmer 62. The ATF warmer outlet passage L22 is a passage connecting the ATF warmer 62 and the oil cooler 63. The oil cooler outlet passage L23 is a passage connecting the oil cooler 63 and the water pump 60. Note that out of the first auxiliary passage L20, a part connecting the water pump 60 and the first block side outlet hole 16 outside the cylinder block 3 corresponds to the "second passage" of the claims.

In the first auxiliary passage L20, the coolant discharged from the water pump 60 flows into the water jacket 20 through the coolant-introducing hole 15, and is then led out from the first block side outlet hole 16 to the ATF warmer introduction passage L21. Then, the coolant flows into the ATF warmer 62 to heat the ATF, and then flows into the oil cooler 63 through the ATF warmer outlet passage L22. The coolant cooled down by heating the ATF cools the oil in the oil cooler 63, and then returns to the water pump 60 through the oil cooler outlet passage L23.

In the ATF warmer introduction passage L21, a first auxiliary switching device TS2 that opens and closes the ATF warmer introduction passage L21 and thus the first auxiliary passage L20 is provided. The first auxiliary switching device TS2 includes a thermostat and a switching valve. When the temperature of the coolant circulating through the ATF warmer introduction passage L21 is lower than a predetermined temperature, the switching valve of the first auxiliary switching device TS2 is fully closed, and circulation of the coolant through the first auxiliary passage L20 stops. On the other hand, when the temperature of the coolant circulating through the ATF warmer introduction passage L21 is equal to or higher than the predetermined temperature, the switching valve of the first auxiliary switching device TS2 is fully opened, and the coolant can circulate through the first auxiliary passage L20. This predetermined temperature is set at about 65° C., for example. In this way, in the present embodiment, the first auxiliary switching device TS2 changes the flow rate of the coolant that passes through the ATF warmer introduction passage L21 and is introduced into the ATF warmer 62 and the oil cooler 63. Such a first auxiliary switching device TS2 corresponds to the "second flow regulating device" of the claims, and the switching valve of the first auxiliary switching device TS2 corresponds to the "second valve" of the claims.

The second auxiliary passage L30 includes the coolant-introducing hole 15, the water jacket 20, the second block side outlet hole 17, an EGR cooler introduction passage L31, an EGR cooler outlet passage L32, a heater outlet passage L33, a second head side jacket 4*b*, and a head outlet passage L34. The EGR cooler introduction passage L31 is a passage connecting the second block side outlet hole 17 and the EGR cooler 64. The EGR cooler outlet passage L32 is a passage connecting the EGR cooler 64 and the heater 65. The heater outlet passage L33 is a passage connecting the heater 65 and the second head side jacket 4*b*. The second head side jacket 4*b* is a passage (water jacket) formed in the cylinder head 4 and extending in a front-to-back direction. The head outlet passage L34 is a passage connecting the second head side jacket 4*b* and the water pump 60. Note that out of the second auxiliary passage L30, a part connecting the water pump 60 and the second block side outlet hole 17 outside the cylinder block 3 corresponds to the "first passage" of the claims.

The second head side jacket 4*b* is positioned on the exhaust side of the first head side jacket 4*a*, and passes around the exhaust port of each cylinder 2. The second head side jacket 4*b* is open at the rear end of the exhaust side surface of the cylinder head 4, and the heater outlet passage L33 is connected to an opening 4*d* (hereinafter referred to as a head side introduction part 4*d*). The second head side jacket 4*b* is open at the front end of the exhaust side surface of the cylinder head 4, and an opening 4*e* (hereinafter referred to as a second head side outlet part 4*e*) and the head outlet passage L34 are connected.

In the cylinder head 4, a communication passage 4*f* connecting the first head side jacket 4*a* and the second head side jacket 4*b* is provided. A part of the coolant in the first head side jacket 4*a* can flow into the second head side jacket 4*b* through the communication passage 4*f*.

In the second auxiliary passage L30, the coolant discharged from the water pump 60 flows into the water jacket 20 through the coolant-introducing hole 15, and is then led out from the second block side outlet hole 17 to the EGR cooler introduction passage L31. Then, the coolant flows into the EGR cooler 64 to cool the EGR gas, and then flows into the heater 65 through the EGR cooler outlet passage L32. The coolant warmed up by cooling the EGR gas heats the air in the heater 65, and then passes through the heater outlet passage L33 and enters the second head side jacket 4b via the head side introduction part 4d. The coolant cooled down by heating the air in the heater 65 moves forward in the second head side jacket 4b while cooling the cylinder head 4, and returns to the water pump 60 through the second head side outlet part 4e and the head outlet passage L34.

In the head outlet passage L34, a second auxiliary switching device SV1 that opens and closes the head outlet passage L34 and thus the second auxiliary passage L30 is provided. The second auxiliary switching device SV1 includes a solenoid valve that opens and closes the head outlet passage L34. An opening degree of the solenoid valve can be changed to a fully closed position, a fully opened position, or an intermediate opening degree between the fully closed position and the fully opened position, and is changed to an arbitrary opening degree by the PCM according to an engine operating state or the like. When the solenoid valve is closed, circulation of the coolant in the second auxiliary passage L30 stops. When the solenoid valve is opened, the coolant can circulate through the second auxiliary passage L30. In this way, in the present embodiment, the second auxiliary switching device SV1 changes the flow rate of the coolant circulating through the second auxiliary passage L30 (coolant introduced into the EGR cooler 64 and the heater 65). Such a second auxiliary switching device SV1 corresponds to the "first flow regulating device" of the claims, and the solenoid valve of the second auxiliary switching device SV1 corresponds to the "first valve" of the claims.

Here, each of the passages L10, L20, and L30 includes the water jacket 20. However, as will be described later, the water jacket 20 is divided by a spacer 30 into a passage constituting a part of the main passage L10, a passage constituting a part of the first auxiliary passage L20, and a passage constituting a part of the second auxiliary passage L30.

(2) Structure Around the Engine

Figure 3:
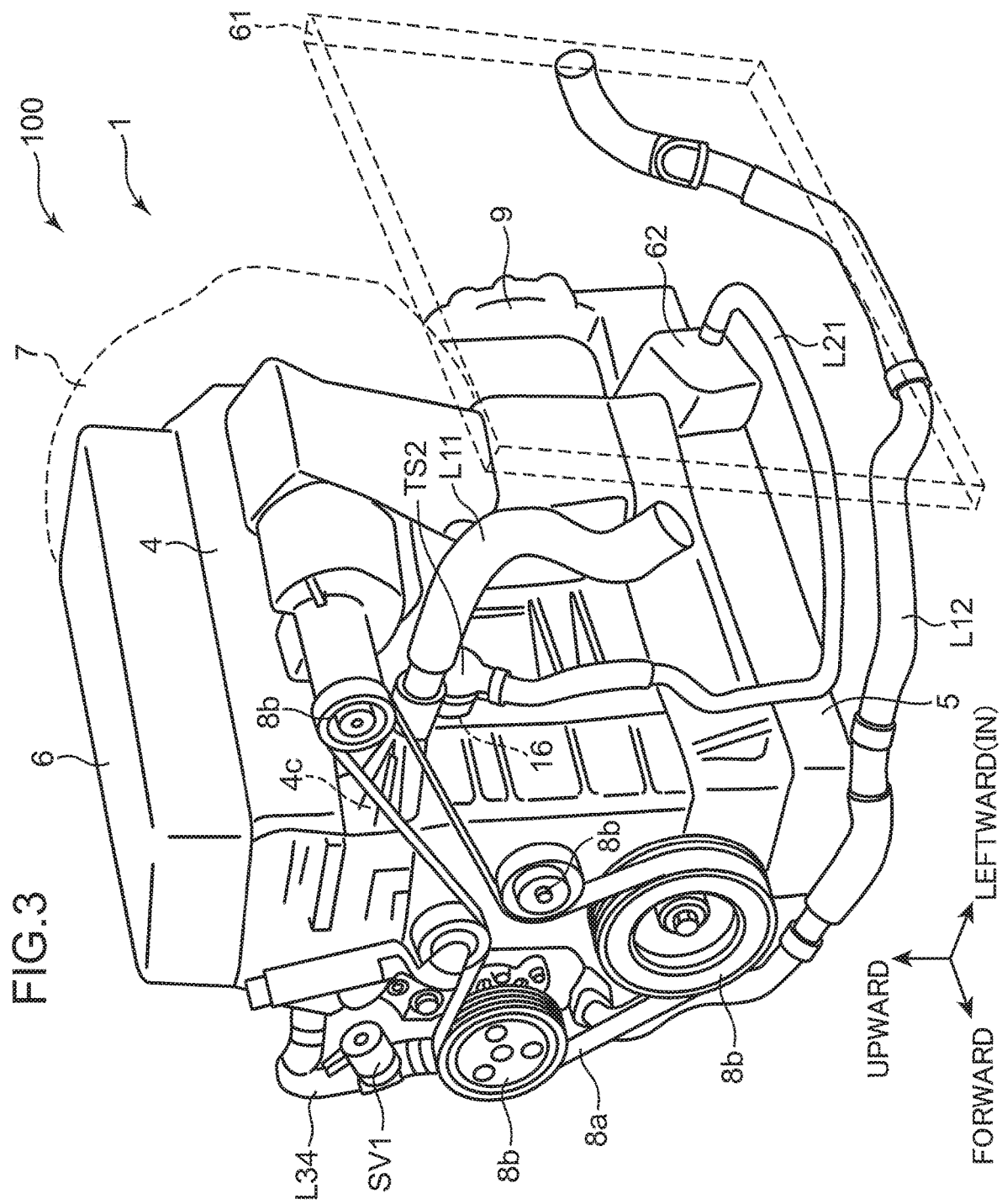
FIG. 3 is a perspective view of the engine body and peripheral devices thereof when viewed from an intake side.
Figure 4:
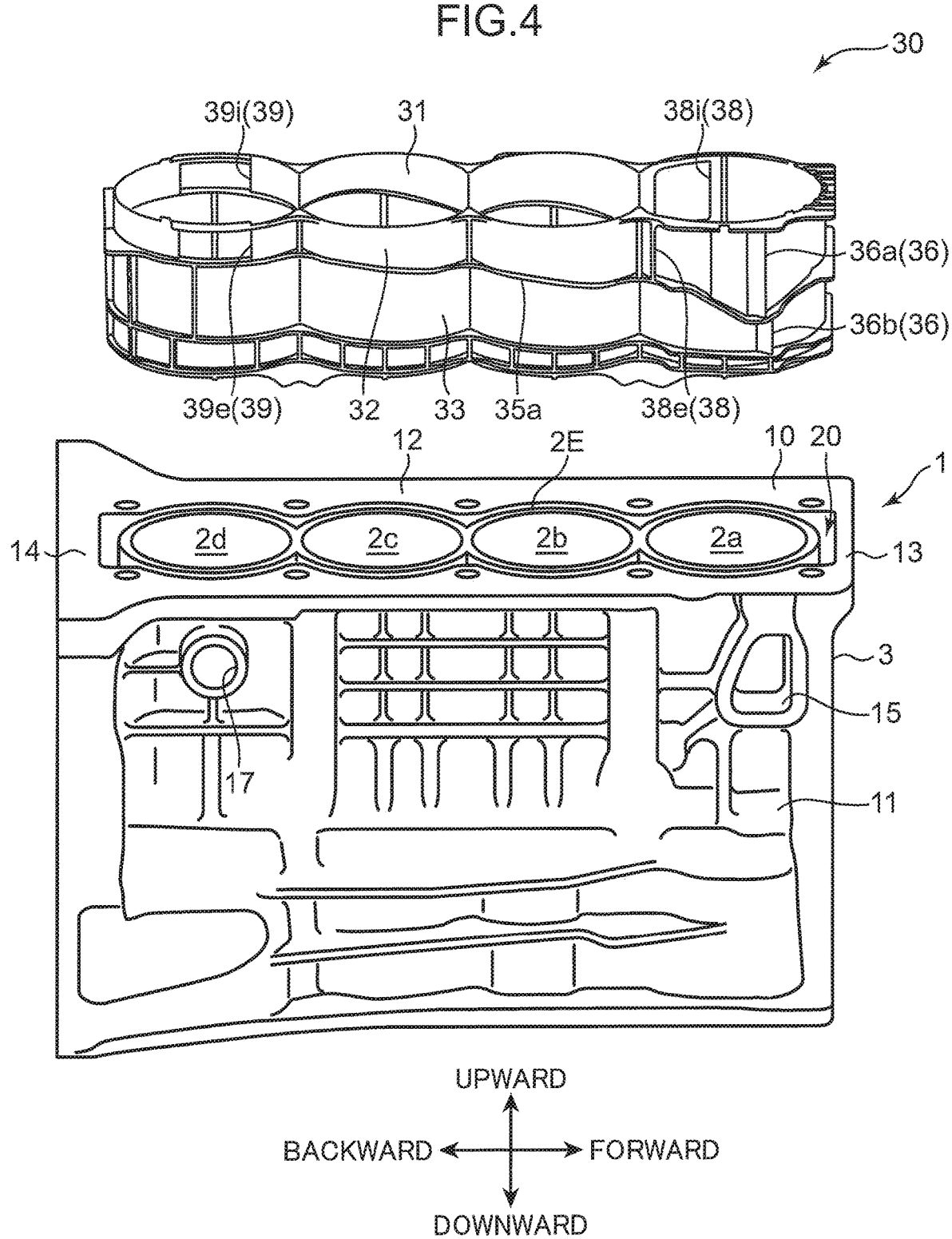
FIG. 4 is a perspective view showing a cylinder block and a spacer.
Figure 5:
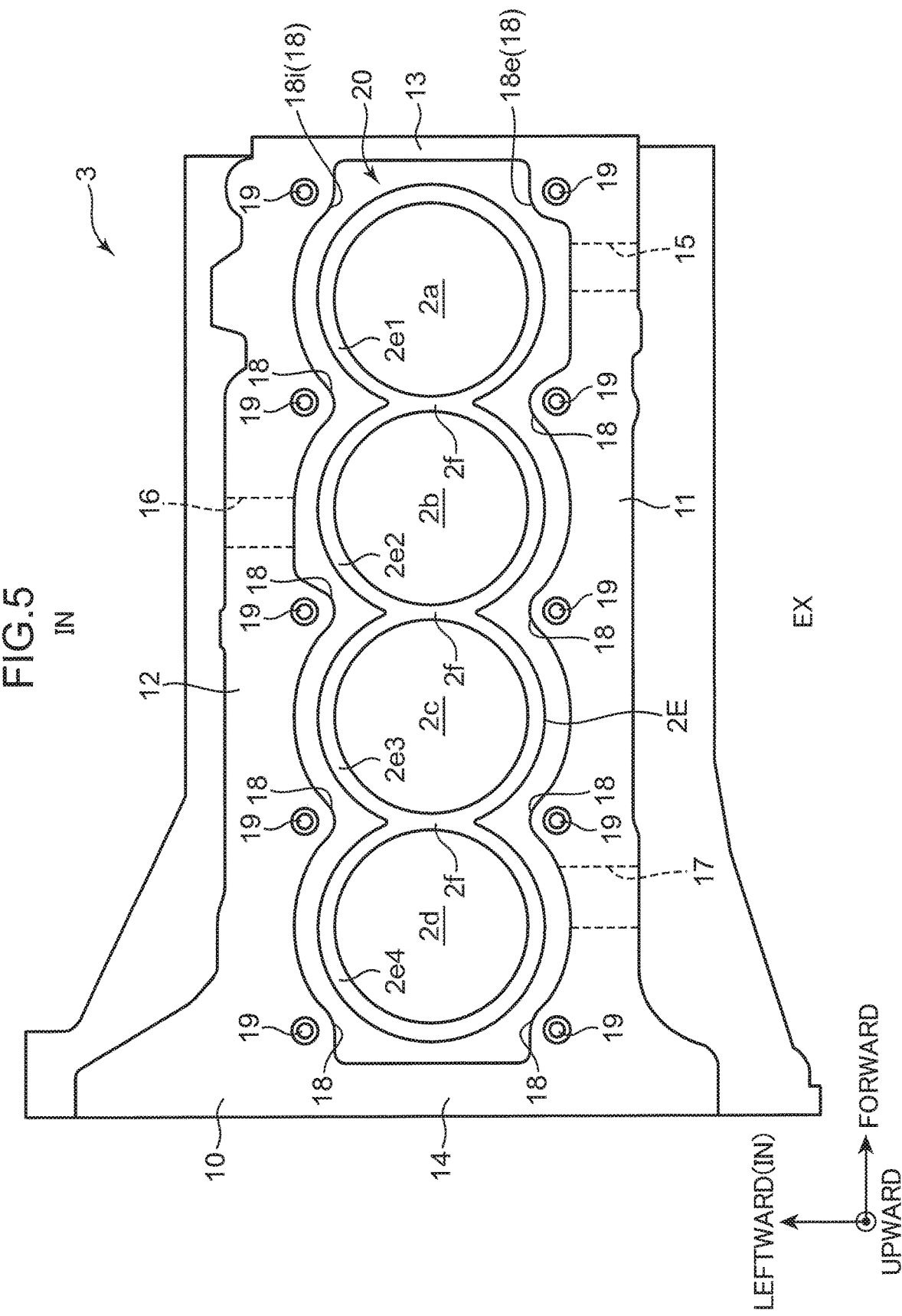
FIG. 5 is a top view of the cylinder block.

FIG. 2 is a perspective view of the engine body 1 and peripheral devices thereof when viewed from the exhaust side. FIG. 3 is a perspective view of the engine body 1 and peripheral devices thereof when viewed from the intake side. FIG. 4 is a perspective view showing the cylinder block 3 and the spacer 30. FIG. 5 is a top view of the cylinder block 3 with the spacer 30 not housed in the water jacket 20.

The engine body 1 includes, in addition to the cylinder block 3 and the cylinder head 4, a head cover 6 covering a camshaft or the like provided above the cylinder head 4, various auxiliary machines 7, and an oil pan 5 provided below the cylinder block 3. The automatic transmission 9 is disposed backward of the cylinder block 3. The radiator 61 is disposed on the intake side of the engine body 1.

As shown in FIG. 5 and other figures, the block outer peripheral wall 10 is formed in a substantially rectangular shape. The block outer peripheral wall 10 includes an exhaust side wall 11 extending in a front-to-back direction on the exhaust side, an intake side wall 12 extending substantially parallel to the exhaust side wall 11 on the intake side, a front side wall 13 extending in a right-to-left direction between the front end of the exhaust side wall 11 and the front end of the intake side wall 12, and a rear side wall 14 extending in a right-to-left direction between the rear end of the exhaust side wall 11 and the rear end of the intake side wall 12.

In the block outer peripheral wall 10, a plurality of bolt holes 19 opened on an upper surface thereof is formed. Head bolts for fastening the cylinder block 3 and the cylinder head 4 are screwed into the bolt holes 19. Each of the exhaust side wall 11 and the intake side wall 12 is provided with bulging parts 18 each bulging inward (toward the block inner peripheral wall 2E) at the front end, the rear end, and intermediate positions facing boundaries between the adjacent cylinders 2. One bolt hole 19 is formed in each of the bulging parts 18.

As shown in FIG. 3, the water pump 60 is coupled to a crankshaft via a belt 8a and a plurality of pulleys 8b, and is driven by the crankshaft, that is, by the engine, to discharge the coolant. The water pump 60 is fixed to the front end of the exhaust side wall 11. The coolant-introducing hole 15 is formed at the front end of the exhaust side wall 11. As shown in FIG. 5 and other figures, the coolant-introducing hole 15 is positioned forward of the center of the first cylinder 2a in a front-to-back direction. In more detail, the coolant-introducing hole 15 faces a part of a front side and exhaust side of a wall part (first cylinder wall 2e1 described later) corresponding to the first cylinder 2a in the block inner peripheral wall 2E, the part being curved such that the part is positioned closer to the intake side as the part is closer to the front.

As shown in FIG. 3, the first head side outlet part 4c is open at the front end of the intake side surface of the cylinder head 4. The radiator introduction passage L11 extends leftward from the front end of the intake side surface of the cylinder head 4 toward the radiator 61. The radiator outlet passage L12 passes forward of the engine body 1 and extends from the radiator 61 to the water pump 60. As shown in FIG. 2, the main switching device TS1 is provided near the water pump 60.

As shown in FIGS. 3, 5 and other figures, the first block side outlet hole 16 is formed in the intake side wall 12. The first block side outlet hole 16 is formed at a position facing the second cylinder 2b. The ATF warmer 62 is disposed close to the rear end of the intake side part of the oil pan 5. The ATF warmer introduction passage L21 extends from the first block side outlet hole 16 to the ATF warmer 62 along the intake side surface of the engine body 1. As shown in FIG. 2, the oil cooler 63 is fixed to a lower part of the exhaust side surface of the cylinder block 3. The ATF warmer outlet passage L22 passes below the oil pan 5 and extends from the ATF warmer 62 to the oil cooler 63. The oil cooler outlet passage L23 extends obliquely upward and forward from the oil cooler 63, and is connected to the water pump 60 at the upper end thereof.

As shown in FIGS. 2, 5 and other figures, the second block side outlet hole 17 is formed in the exhaust side wall 11. The second block side outlet hole 17 is formed at a position facing the fourth cylinder 2d. The EGR cooler 64 is disposed backward of the cylinder block 3 to extend to the right and left. The EGR cooler introduction passage L31 extends from the second block side outlet hole 17 so as to go around an upper part of the EGR cooler 64 and is connected to a lower surface of the EGR cooler 64. The EGR cooler outlet passage L32 extends upward from the EGR cooler 64. Although the heater 65 is not shown in FIG. 2, the EGR cooler outlet passage L32 extends to the heater 65. The head side introduction part 4d is open at the rear end of the exhaust side surface of the cylinder head 4. The heater outlet passage L33 extends from the heater 65 to the rear end of the exhaust side surface of the cylinder head 4. The second head side outlet part 4e is open at the front end of the exhaust side surface of the cylinder head 4. The head outlet passage L34 extends rightward from the front end of the exhaust side surface of the cylinder head 4 and then extends downward, and is connected to the water pump 60 at its lower end. The second auxiliary switching device SV1 is provided in an intermediate part of an up-and-down direction of the head outlet passage L34.

(3) Detailed Structure of the Spacer and the Water Jacket

The detailed structure of the spacer 30 and the water jacket 20 will be described.

Figure 6:
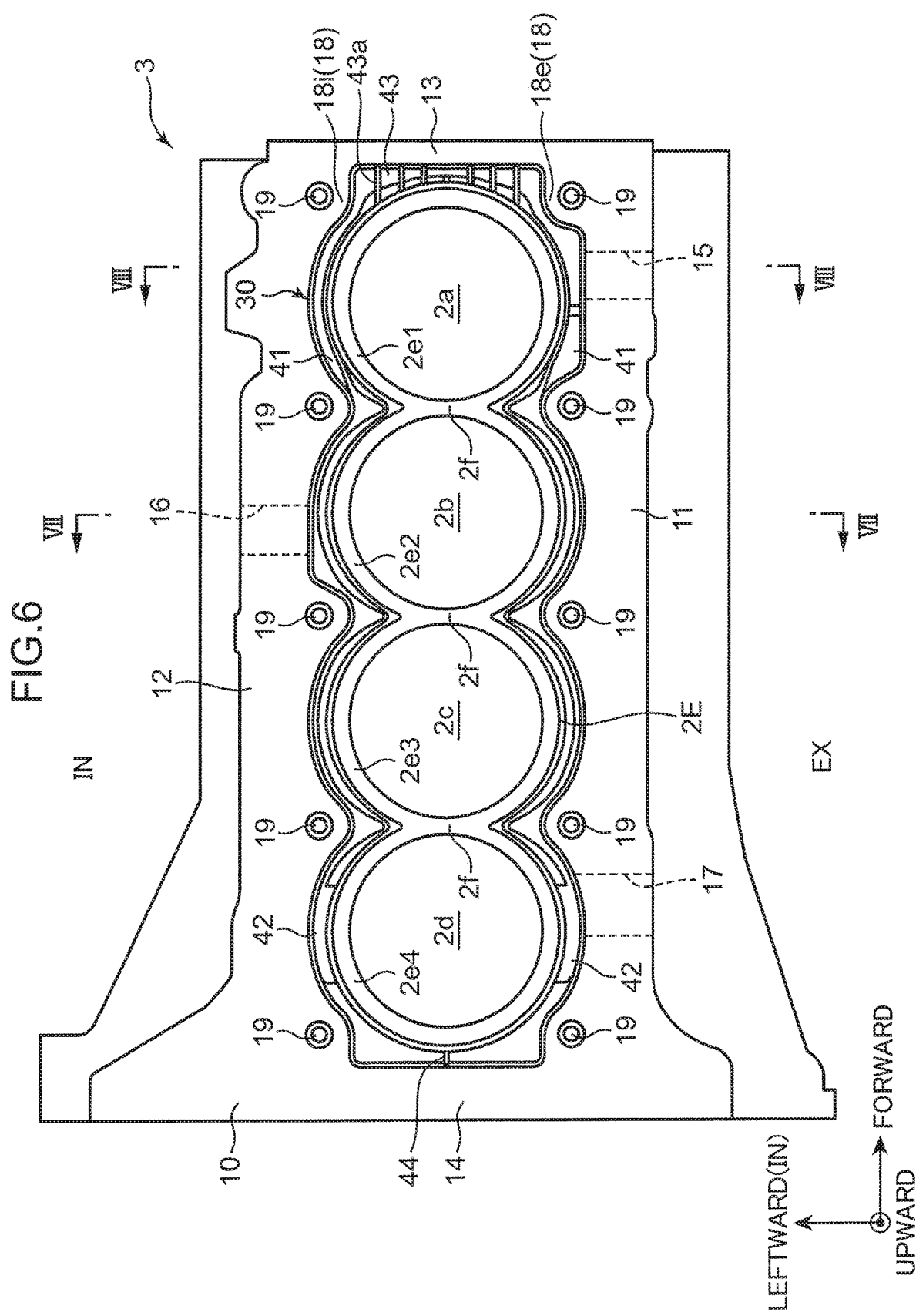
FIG. 6 is a top view of the cylinder block in which the spacer is housed.
Figure 7:
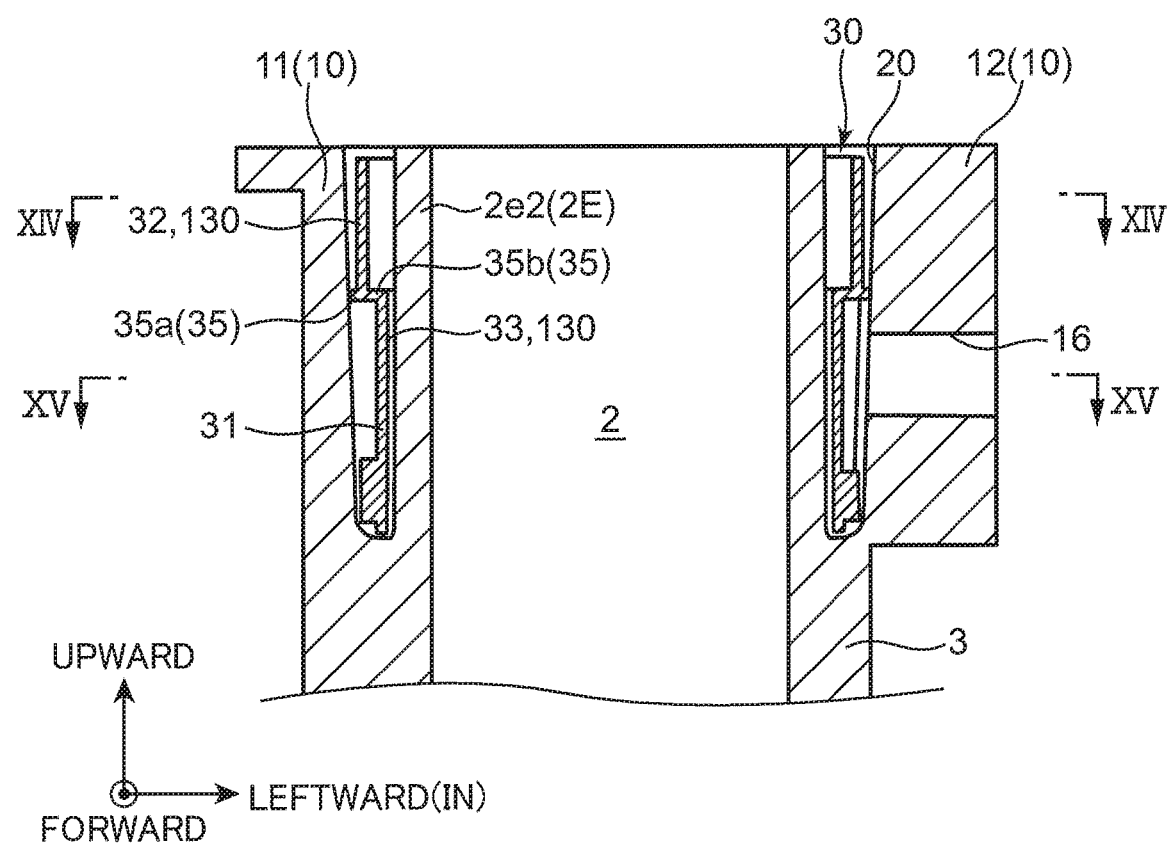
FIG. 7 is a cross-sectional view along the line VII-VII of FIG. 6.
Figure 8:
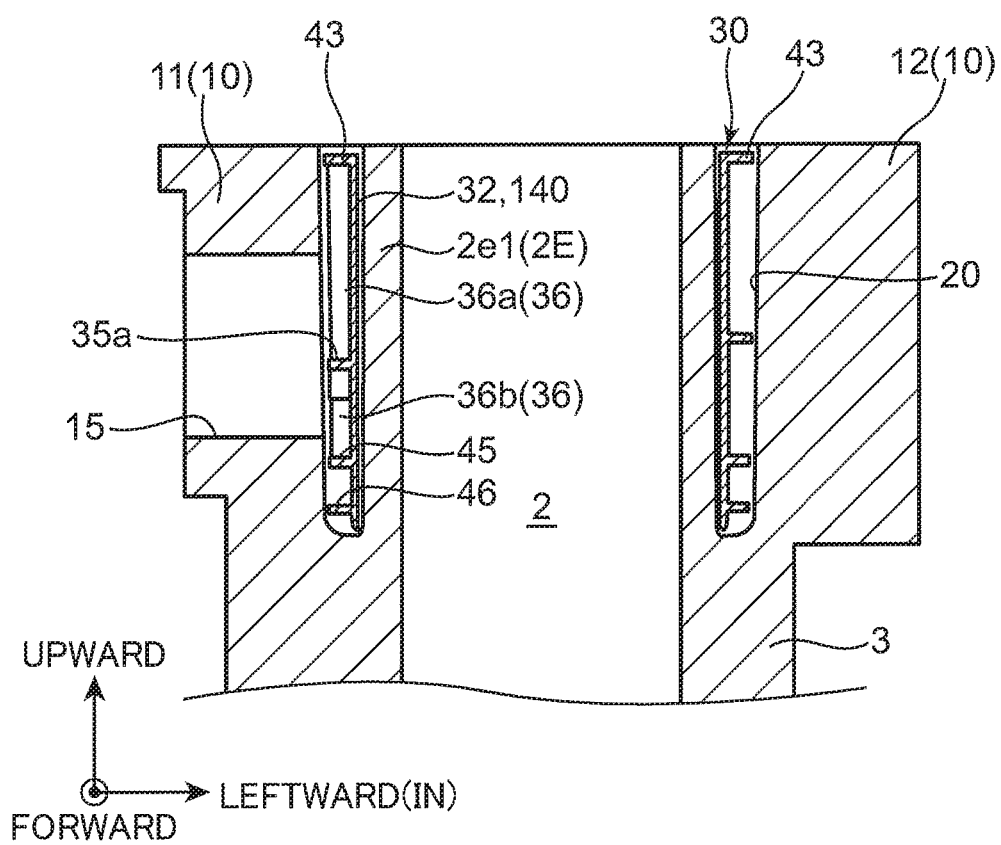
FIG. 8 is a cross-sectional view along the line VIII-VIII of FIG. 6.
Figure 9:
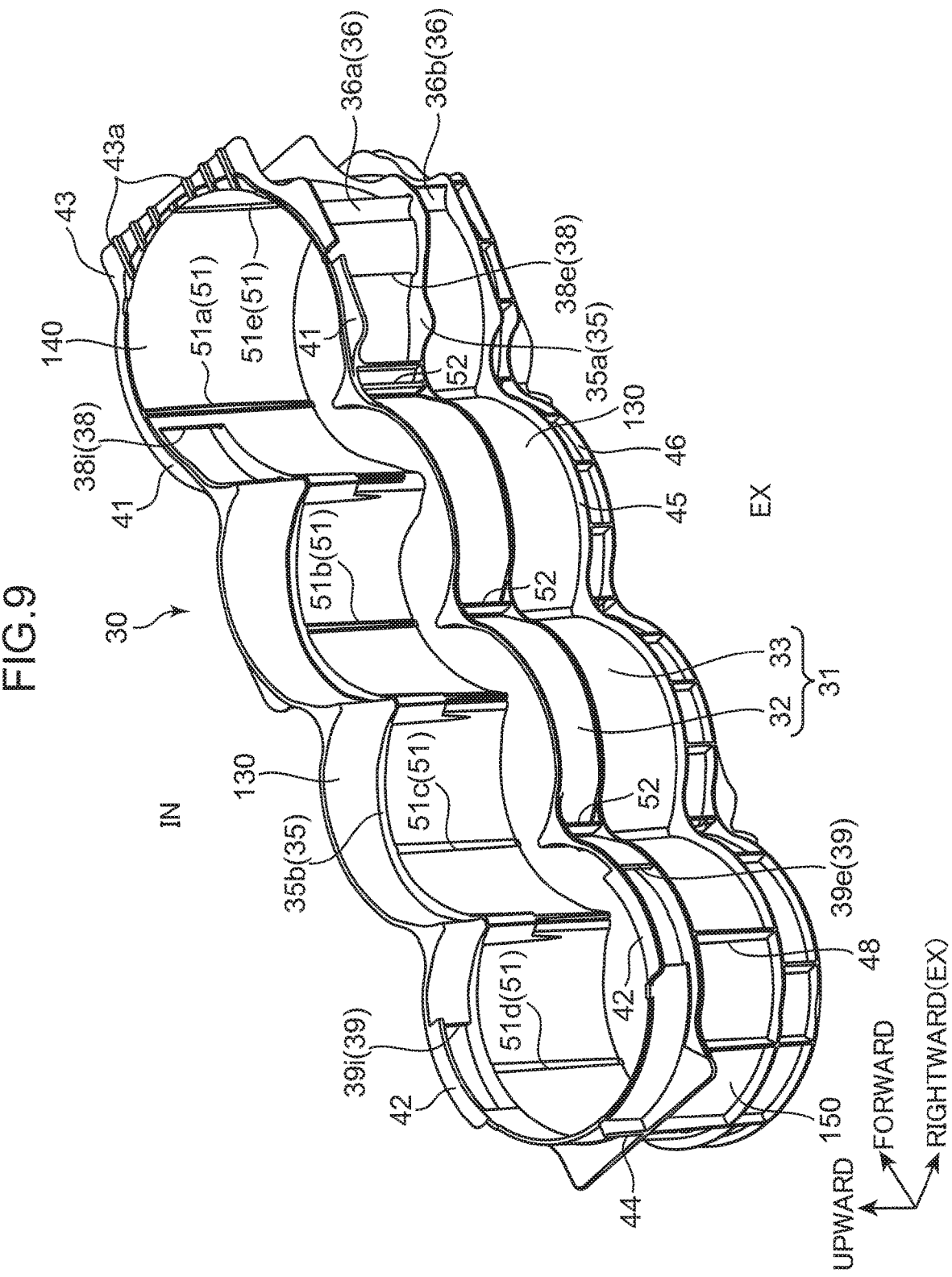
FIG. 9 is a perspective view of the spacer.
Figure 10:
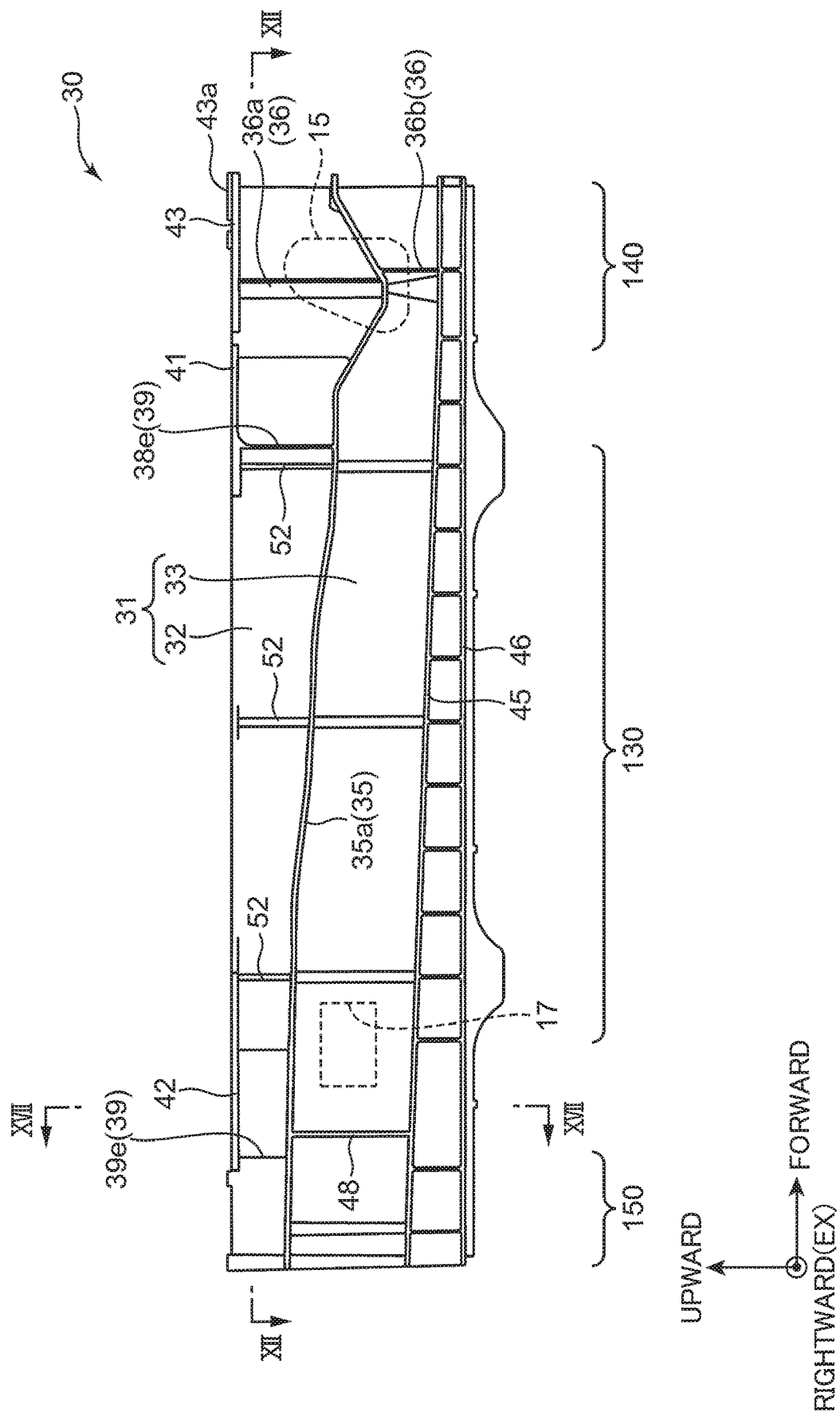
FIG. 10 is a side view of an exhaust side of the spacer.
Figure 11:
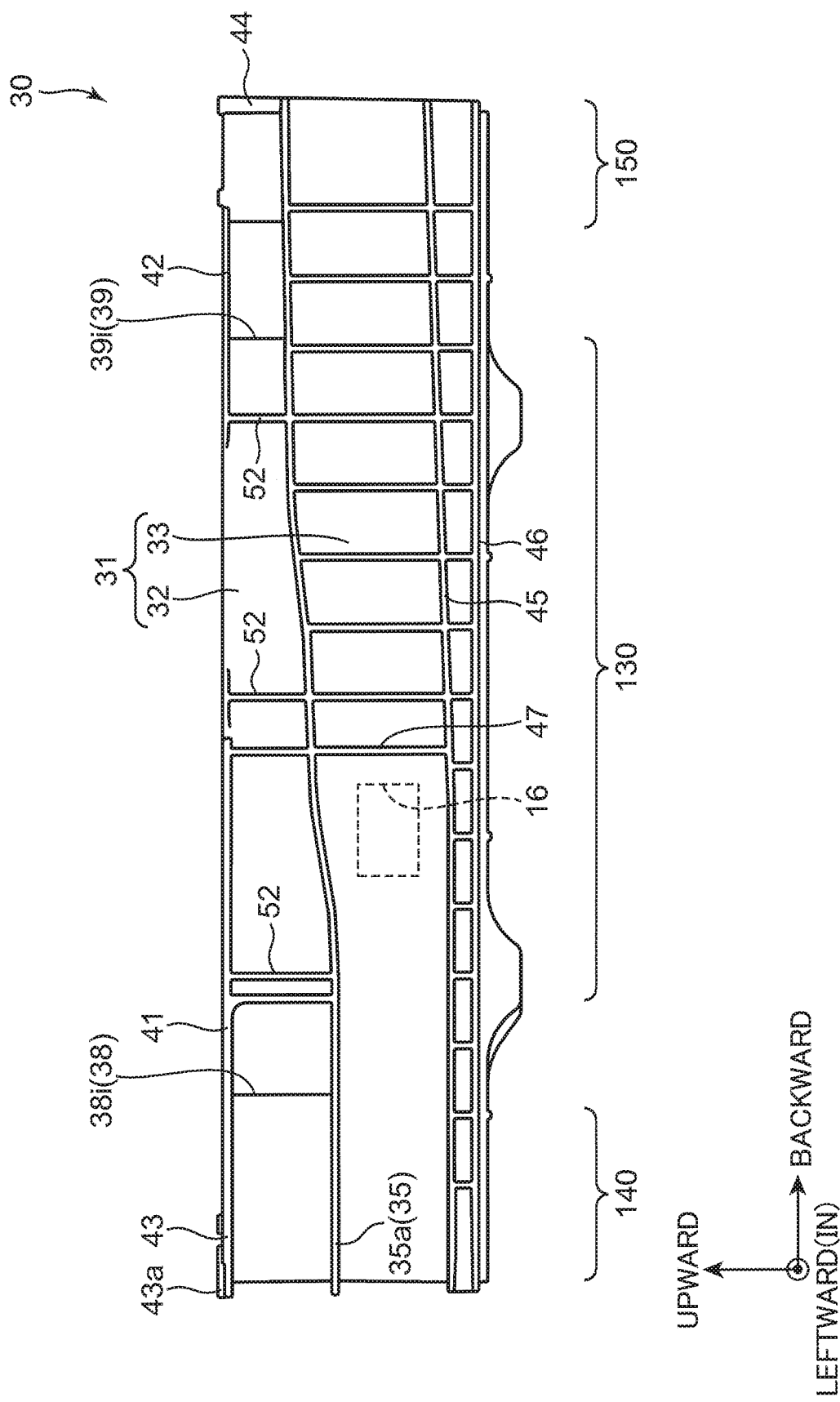
FIG. 11 is a side view of an intake side of the spacer.
Figure 12:
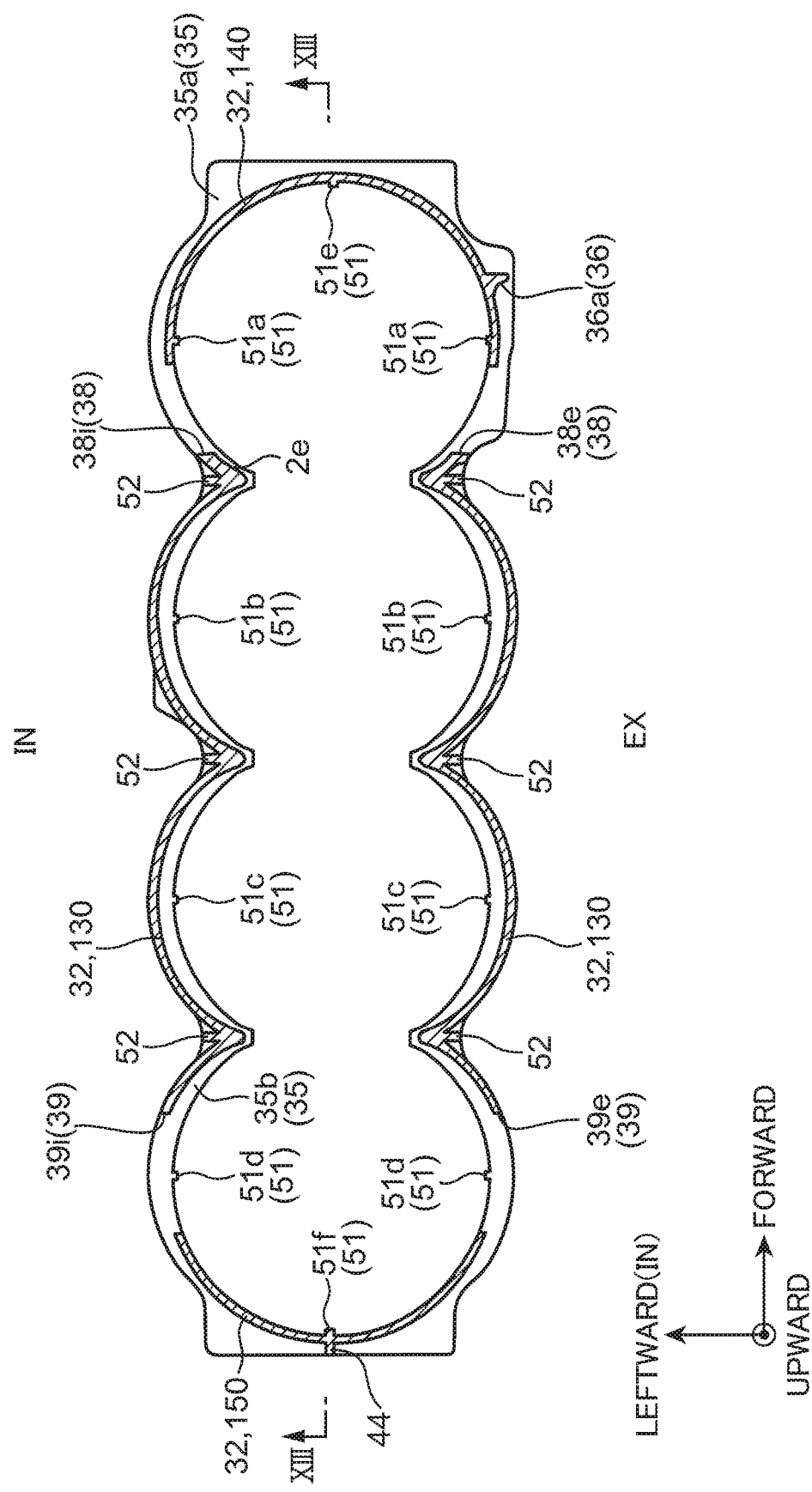
FIG. 12 is a cross-sectional view of the spacer along the line XII-XII of FIG. 10.
Figure 13:
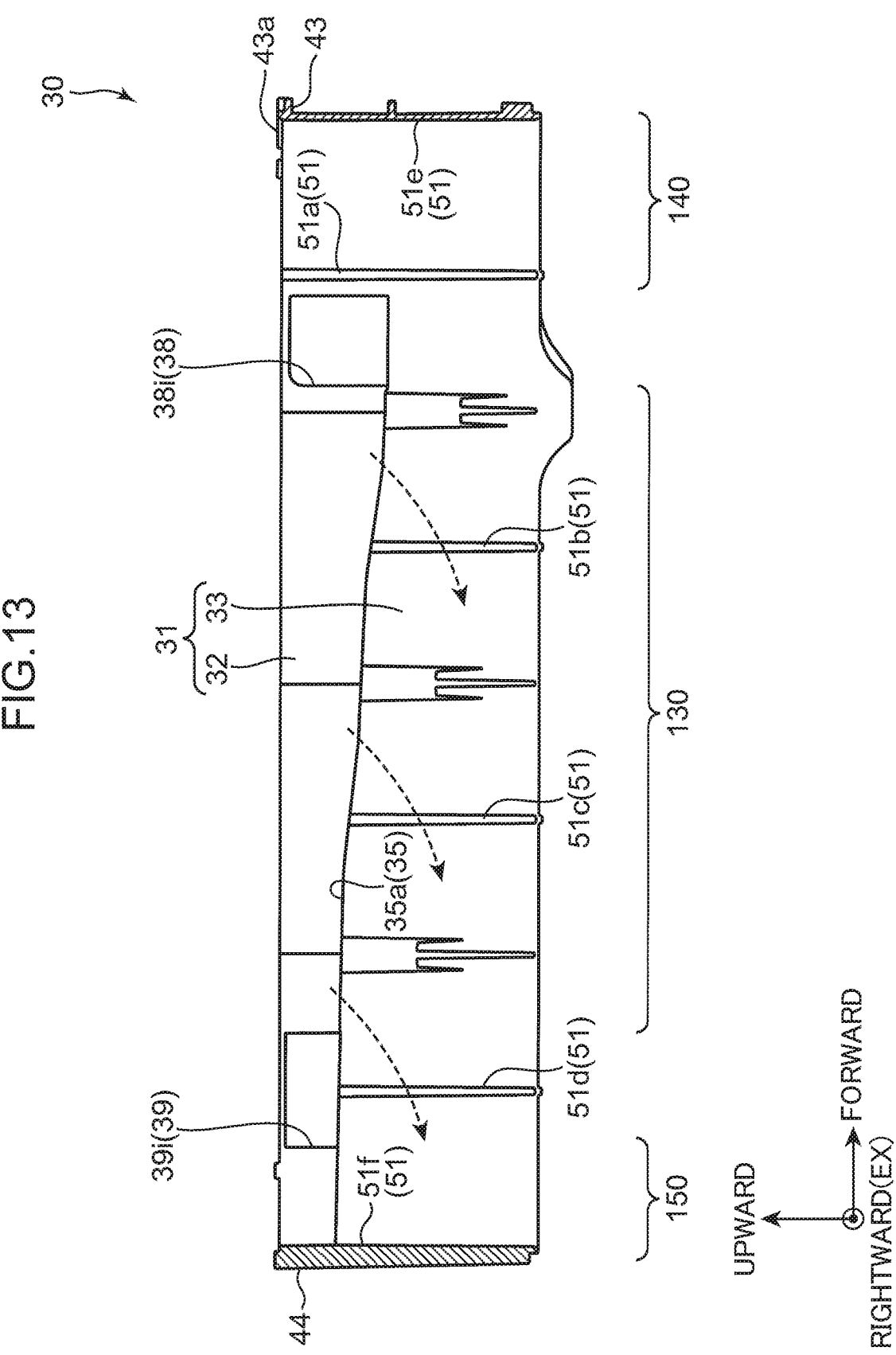
FIG. 13 is a cross-sectional view of the spacer along the line XIII-XIII of FIG. 12.
Figure 14:
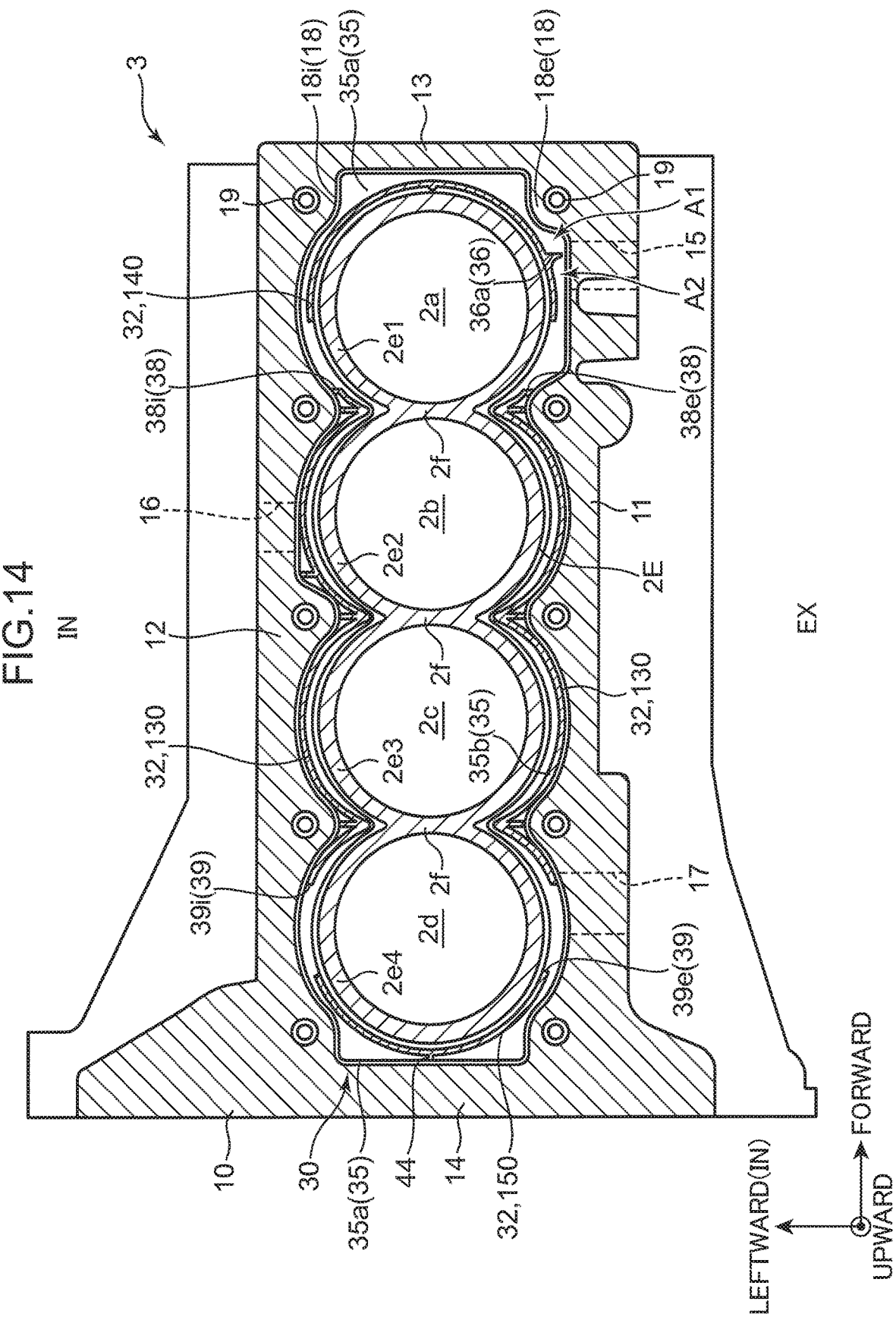
FIG. 14 is a cross-sectional view of the spacer along the line XIV-XIV of FIG. 7.
Figure 15:
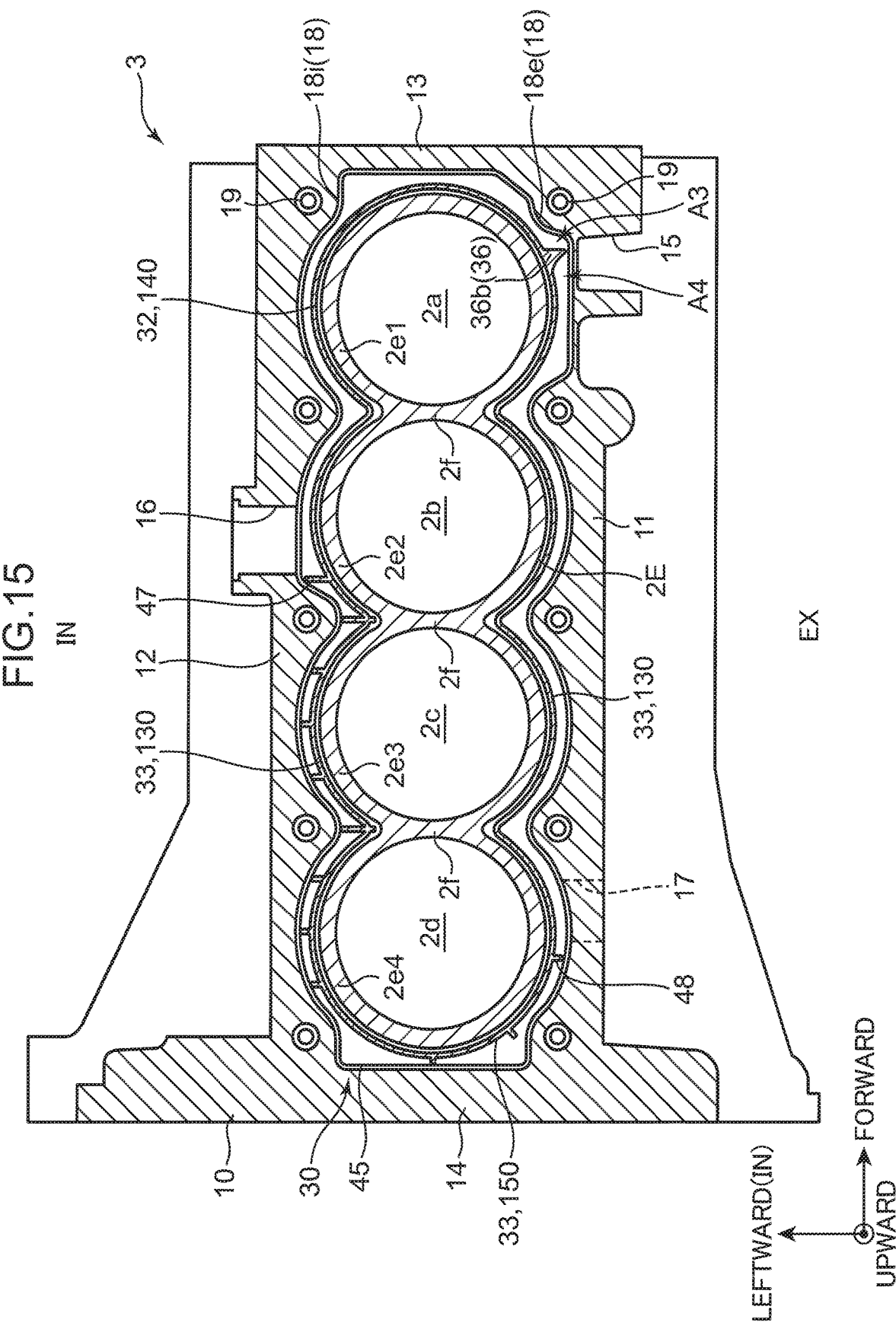
FIG. 15 is a cross-sectional view of the spacer along the line XV-XV of FIG. 7.

FIG. 6 is a drawing corresponding to FIG. 5 and is a top view of the cylinder block 3 with the spacer 30 housed in the water jacket 20. FIG. 7 is a cross-sectional view along the line VII-VII of FIG. 6. FIG. 8 is a cross-sectional view along the line VIII-VIII of FIG. 6. FIG. 9 is a perspective view of the spacer 30. FIG. 10 is a side view of the exhaust side of the spacer 30, and FIG. 11 is a side view of the intake side of the spacer 30. FIG. 12 is a cross-sectional view of the spacer 30 along the line XII-XII of FIG. 10. FIG. 13 is a cross-sectional view of the spacer 30 along the line XIII-XIII of FIG. 12. FIG. 14 is a cross-sectional view along the line XIV-XIV of FIG. 7. FIG. 15 is a cross-sectional view along the line XV-XV of FIG. 7.

The spacer 30 is housed in the water jacket 20 in contact with a bottom surface of the water jacket 20. The spacer 30 is made of, for example, a material (for example, a synthetic resin) having a lower thermal conductivity than a material of the cylinder block 3 (for example, an aluminum alloy).

The spacer 30 includes a peripheral wall 31 surrounding the entire outer periphery of the block inner peripheral wall 2E defining each cylinder 2. The peripheral wall 31 divides the water jacket 20 into an inner space close to the cylinders 2 and an outer space far from the cylinders 2. The block inner peripheral wall 2E and the peripheral wall 31 extend in a substantially arc shape in top view along each cylinder 2.

The block inner peripheral wall 2E integrally includes a first cylinder wall 2e1 defining the first cylinder 2a, a second cylinder wall 2e2 defining the second cylinder 2b, a third cylinder wall 2e3 defining the third cylinder 2c, and a fourth cylinder wall 2e4 defining the fourth cylinder 2d. The first cylinder wall 2e1 to the fourth cylinder wall 2e4 are each formed in a cylindrical shape and connected to each other. An inter-bore part 2f is formed between the cylinders 2 adjacent to each other, that is, between the first cylinder wall 2e1 and the second cylinder wall 2e2, between the second cylinder wall 2e2 and the third cylinder wall 2e3, and between the third cylinder wall 2e3 and the fourth cylinder wall 2e4. In other words, the inter-bore part 2f is a part shared between adjacent cylinder walls.

The peripheral wall 31 of the spacer 30 has a shape in which four circles are slightly overlapped and connected in top view and the overlap part is removed, corresponding to the shape of the block inner peripheral wall 2E described above. The peripheral wall 31 has a height similar to the depth of the water jacket 20. Accordingly, almost the entire water jacket 20 is divided into the inner space and the outer space by the peripheral wall 31.

The peripheral wall 31 includes first guide element 38 at a position facing the first cylinder wall 2e1. The first guide element 38 includes a pair of through holes penetrating the peripheral wall 31, that is, an intake side first through hole 38i and an exhaust side first through hole 38e. Both the first through holes 38i and 38e face each other in a right-to-left direction. In more detail, the intake side first through hole 38i faces an intake side surface at the rear of the first cylinder wall 2e1, and the exhaust side first through hole 38e faces an exhaust side surface at the rear of the first cylinder wall 2e1. Both the first through holes 38i and 38e are formed to face a range from a position slightly backward of the center in a front-to-back direction of the first cylinder wall 2e1 to a position slightly forward of the rear end of the first cylinder wall 2e1 (boundary between the first cylinder wall 2e1 and the second cylinder wall 2e2).

The peripheral wall 31 includes second guide element 39 at a position facing the fourth cylinder wall 2e4. The second guide element 39 includes a pair of through holes penetrating the peripheral wall 31, that is, an intake side second through hole 39i and an exhaust side second through hole 39e. Both the second through holes 39i and 39e face each other in a right-to-left direction. In more detail, the intake side second through hole 39i faces the intake side surface at the central part in a front-to-back direction of the fourth cylinder wall 2e4, and the exhaust side second through hole 39e faces the exhaust side surface at the central part in a front-to-back direction of the fourth cylinder wall 2e4. Both the second through holes 39i and 39e are formed to face a range including the center in a front-to-back direction of the fourth cylinder wall 2e4 and excluding the front end and the rear end of the fourth cylinder wall 2e4.

The outer space of the peripheral wall 31 and the inner space of the peripheral wall 31 communicate with each other via the first guide element 38 (intake side and exhaust side first through holes 38i and 38e) and the second guide element 39 (intake side and exhaust side second through holes 39i and 39e) described above.

(Dividing Wall)

The spacer 30 includes a dividing wall 35 dividing the peripheral wall 31 vertically. The dividing wall 35 is provided over the entire circumference of the peripheral wall 31 and divides the peripheral wall 31 into an upper peripheral wall 32 and a lower peripheral wall 33. In other words, the spacer 30 includes the upper peripheral wall 32, the lower peripheral wall 33 below the upper peripheral wall 32, and the dividing wall 35 formed at a boundary between the upper peripheral wall 32 and the lower peripheral wall 33.

The dividing wall 35 includes an intermediate flange 35a and a step 35b.

Specifically, the peripheral wall 31 is provided with the intermediate flange 35a protruding outward (toward the block outer peripheral wall 10) from an intermediate position in an up-and-down direction of the outer peripheral surface thereof. The intermediate flange 35a is formed over the entire circumference of the peripheral wall 31. As shown in FIGS. 7 and 8, the intermediate flange 35a protrudes to a vicinity of the block outer peripheral wall 10. With this configuration, the space between the peripheral wall 31 and the block outer peripheral wall 10, that is, the space outside the peripheral wall 31 in the water jacket 20 is divided into spaces above and below the intermediate flange 35a over the entire circumference of the peripheral wall 31.

Furthermore, a part of the peripheral wall 31 from the rear end of the first guide element 38 to the front end of the second guide element 39 is formed such that the lower peripheral wall 33 is positioned inside the upper peripheral wall 32 (near the block inner peripheral wall 2E) on both the intake side and the exhaust side. The step 35b is formed to extend inward from the lower end of the upper peripheral wall 32 toward the upper end of the lower peripheral wall 33 so as to connect the upper peripheral wall 32 and the lower peripheral wall 33.

The intermediate flange 35a and the step 35b are provided at the same height position. In the part of the peripheral wall 31 from the rear end of the first guide element 38 to the front end of the second guide element 39, the peripheral wall 31 is divided into the upper peripheral wall 32 and the lower peripheral wall 33 by the intermediate flange 35a and the step 35b. Hereinafter, as appropriate, the part of the peripheral wall 31 from the rear end of the intake side first through hole 38i to the front end of the intake side second through hole 39i, and the part from the rear end of the exhaust side first through hole 38e to the front end of the exhaust side second through hole 39e are collectively referred to as a central peripheral wall 130.

As shown in FIG. 7 and other figures, the step 35b protrudes to a vicinity of the block inner peripheral wall 2E. With this configuration, the space between the central peripheral wall 130 and the block inner peripheral wall 2E, that is, the space inside the central peripheral wall 130 in the water jacket 20 is divided into spaces above and below the step 35b substantially over the entire circumference of the central peripheral wall 130.

The intermediate flange 35a and the step 35b are connected to each other in each of the guide elements 38 and 39, and constitute lower surfaces of the through holes (38i, 38e, 39i, 39e) constituting the guide elements 38 and 39. That is, each of the guide elements 38 and 39 is formed in the upper peripheral wall 32 constituting a part of the peripheral wall 31 above the intermediate flange 35a and the step 35b, and is formed as a through hole with the intermediate flange 35a and the step 35b as lower surfaces.

The step 35b is not formed in a part of the peripheral wall 31 forward of the front end of the first guide element 38, that is, a part including the front end of the peripheral wall 31 and ranging from the front end of the intake side first through hole 38i to the front end of the exhaust side first through hole 38e (hereinafter, as appropriate, this part is referred to as a front peripheral wall 140). In other words, the front peripheral wall 140 is divided into the upper peripheral wall 32 and the lower peripheral wall 33 only by the intermediate flange 35a. That is, an inner peripheral surface of the front peripheral wall 140 is not divided vertically, and only an outer peripheral surface is vertically divided by the intermediate flange 35a. With this configuration, as shown in FIG. 8, at the front part of the water jacket 20 into which the front peripheral wall 140 is inserted, only the space outside the peripheral wall 31 (space between the peripheral wall 31 and the block outer peripheral wall 10) is vertically divided by the intermediate flange 35a, and the space inside the peripheral wall 31 (space between the block inner peripheral wall 2E and the peripheral wall 31) is not divided vertically.

Similarly, the step 35b is not formed in a part of the peripheral wall 31 on a back side of the rear end of the second guide element 39, that is, a part including the rear end of the peripheral wall 31 and ranging from the rear end of the intake side second through hole 39i to the rear end of the exhaust side second through hole 39e (hereinafter, as appropriate, this part is referred to as a rear peripheral wall 150). In other words, the rear peripheral wall 150 is divided into the upper peripheral wall 32 and the lower peripheral wall 33 only by the intermediate flange 35a. That is, an inner peripheral surface of the rear peripheral wall 150 is not divided vertically, and only an outer peripheral surface is vertically divided by the intermediate flange 35a. With this configuration, at the rear part of the water jacket 20 into which the rear peripheral wall 150 is inserted, only the space outside the peripheral wall 31 (space between the peripheral wall 31 and the block outer peripheral wall 10) is vertically divided by the intermediate flange 35a, and the space inside the peripheral wall 31 (space between the block inner peripheral wall 2E and the peripheral wall 31) is not divided vertically.

Here, as shown in FIG. 15, the lower peripheral wall 33 is close to the block inner peripheral wall 2E over the entire circumference. Specifically, a clearance dimension between the lower peripheral wall 33 and the block outer peripheral wall 10 is larger than a clearance dimension between the lower peripheral wall 33 and the block inner peripheral wall 2E over the entire circumference of the peripheral wall 31. That is, in the lower region of the water jacket 20 (space below the dividing wall 35), a flow channel area is larger on the outside than on the inside of the peripheral wall 31 (lower peripheral wall 33).

Meanwhile, as shown in FIG. 14, the upper peripheral wall 32 of the central peripheral wall 130 is close to the block outer peripheral wall 10, and the upper peripheral wall 32 of each of the front peripheral wall 140 and the rear peripheral wall 150 is close to the block inner peripheral wall 2E. That is, a clearance dimension between the upper peripheral wall 32 of the front peripheral wall 140 and the block outer peripheral wall 10 is larger than a clearance dimension between the upper peripheral wall 32 of the front peripheral wall 140 and the block inner peripheral wall 2E. A clearance dimension between the upper peripheral wall 32 of the rear peripheral wall 150 and the block outer peripheral wall 10 is larger than a clearance dimension between the upper peripheral wall 32 of the rear peripheral wall 150 and the block inner peripheral wall 2E. Meanwhile, a clearance dimension between the upper peripheral wall 32 of the central peripheral wall 130 and the block outer peripheral wall 10 is smaller than a clearance dimension between the upper peripheral wall 32 of the central peripheral wall 130 and the block inner peripheral wall 2E. In other words, in the upper region of the water jacket 20 (space above the dividing wall 35), a partition position by the peripheral wall 31 differs depending on the location. That is, in the front part and rear part of the upper region of the water jacket 20 (regions corresponding to the front peripheral wall 140 and the rear peripheral wall 150), the flow channel area is larger on the outside than on the inside of the peripheral wall 31 (upper peripheral wall 32). In the central part of the upper region of the water jacket 20 (region corresponding to the central peripheral wall 130), the flow channel area is larger on the inside than on the outside of the peripheral wall 31.

Here, the central peripheral wall 130 extends from the rear part of the first cylinder 2a to the front part of the fourth cylinder 2d, and each inter-bore part 2f of the block inner peripheral wall 2E faces the central peripheral wall 130. With this configuration, in a part of the upper region of the water jacket 20 adjacent to each inter-bore part 2f, the flow channel area is larger on the inside than on the outside of the peripheral wall 31 (upper peripheral wall 32).

(Distribution Wall)

On the outer peripheral surface of the exhaust side of the peripheral wall 31, a distribution wall 36 extending in an up-and-down direction and protruding outward (toward the block outer peripheral wall 10) is provided. As shown in FIG. 9 and other figures, the distribution wall 36 is positioned on the front side of the exhaust side first through hole 38e. In the present embodiment, the distribution wall 36 is positioned on the front side of the center of the first cylinder 2a in a front-to-back direction. The intermediate flange 35a extends in the circumferential direction of the peripheral wall 31 so as to divide the distribution wall 36 vertically. The distribution wall 36 includes an upper distribution wall 36a extending upward from the intermediate flange 35*a* and a lower distribution wall 36*b* extending downward from the intermediate flange 35*a*.

Figure 16:
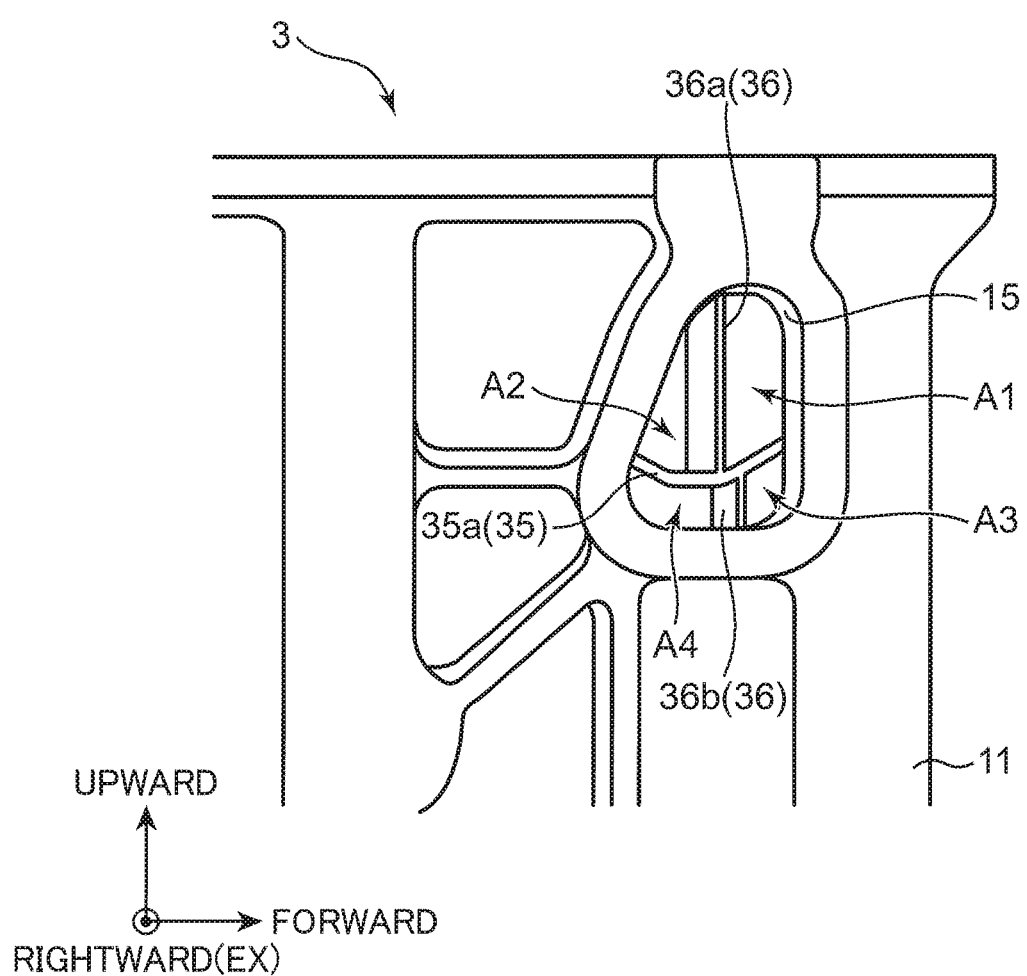
FIG. 16 is a side view in which a vicinity of a coolant-introducing part of the cylinder block is enlarged.

FIG. 16 is an enlarged view of the front end of the exhaust side of the cylinder block 3. As shown in FIG. 16, the distribution wall 36 and the coolant-introducing hole 15 face each other. When viewed from the outside of the coolant-introducing hole 15, the distribution wall 36 extends in an up-and-down direction at an intermediate position in a front-to-back direction of the coolant-introducing hole 15. A part of the intermediate flange 35*a* facing the coolant-introducing hole 15 is positioned between a lower end and an upper end of the coolant-introducing hole 15.

Accordingly, the region facing the coolant-introducing hole 15 in the peripheral wall 31, in other words, a region visually recognized from the outside through the coolant-introducing hole 15 in the space between the peripheral wall 31 and the block outer peripheral wall 10 is divided into four inflow parts shown in FIG. 16, that is, a first inflow part A1, a second inflow part A2, a third inflow part A3, and a fourth inflow part A4. The first inflow part A1 is a region positioned above the intermediate flange 35*a* and forward of the upper distribution wall 36*a*. The second inflow part A2 is a region positioned above the intermediate flange 35*a* and backward of the upper distribution wall 36*a*. The third inflow part A3 is a region positioned below the intermediate flange 35*a* and forward of the lower distribution wall 36*b*. The fourth inflow part A4 is a region positioned below the intermediate flange 35*a* and backward of the lower distribution wall 36*b*.

Areas of the inflow parts A1 to A4 when the peripheral wall 31 is viewed through the coolant-introducing hole 15 are areas of four regions defined by an inner opening edge of the coolant-introducing hole 15 and tips of the intermediate flange 35*a* and the distribution wall 36 (the tips being farthest from the peripheral wall 31). The relationship between the areas is set as follows. That is, the area of the first inflow part A1 and the area of the second inflow part A2 are set to be approximately equal to each other. The area of each of the first and second inflow parts A1 and A2 is larger than the area of either of the third and fourth inflow parts A3 and A4. The area of the third inflow part A3 is smaller than the area of the fourth inflow part A4. For example, the area of the third inflow part A3 is set approximately half of the area of the fourth inflow part A4. As described above, in the present embodiment, the relationship of A3<A4<A1≈A2 is established as the relationship of the areas of the inflow parts A1 to A4.

(Rib)

As shown in FIGS. 12, 13, and other figures, in the inner peripheral surface of the peripheral wall 31, a plurality of ribs protruding inward (toward the block inner peripheral wall 2E) is provided.

In each of the cylinders 2*a* to 2*d*, a pair of ribs 51*a* to 51*d* facing each other across the center of the cylinder 2 is provided in the peripheral wall 31. The ribs 51*a* to 51*d* are ribs extending in an up-and-down direction, and are positioned on a plane extending in a right-to-left direction through the centers of the cylinders 2*a* to 2*d*. Note that FIG. 13 is a diagram showing the inner peripheral surface of the intake side of the peripheral wall 31. Although the inner peripheral surface of the exhaust side of the peripheral wall 31 is not shown, the inner peripheral surface of the intake side and the inner peripheral surface of the exhaust side have substantially the same structure. The ribs 51*a* to 51*d* on the intake side have the same structure as the ribs 51*a* to 51*d* on the exhaust side corresponding thereto.

The pair of first ribs 51*a* corresponding to the first cylinder 2*a* extends from the upper end to the lower end of the front peripheral wall 140 on the plane extending in a right-to-left direction through the center of the first cylinder 2*a*.

The second ribs 51*b*, the third ribs 51*c*, and the fourth ribs 51*d* respectively corresponding to the second cylinder 2*b*, the third cylinder 2*c*, and the fourth cylinder 2*d* extend downward from the upper end of the lower peripheral wall 33. The fourth ribs 51*d* corresponding to the fourth cylinder 2*d* extend downward from the lower edge of the second guide element 39.

Figure 17:
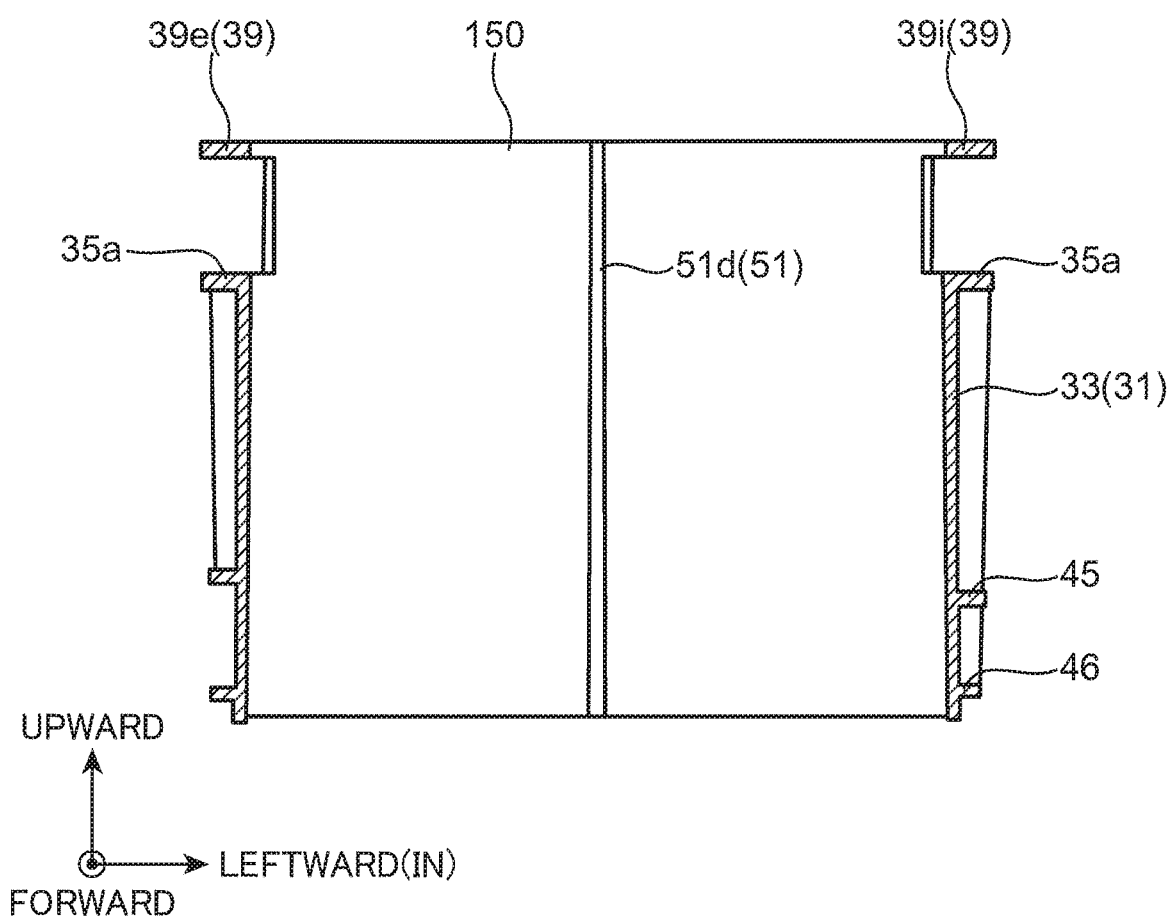
FIG. 17 is a cross-sectional view of the spacer along the line XVII-XVII of FIG. 10.

Ribs 51 extending in an up-and-down direction are also provided at the front end and the rear end of the peripheral wall 31. That is, a fifth rib 51*e* is provided at the front end of the peripheral wall 31 surrounding the first cylinder 2*a* (front peripheral wall 140), and a sixth rib 51*f* is provided at the rear end of the peripheral wall 31 surrounding the fourth cylinder 2*d* (rear peripheral wall 150). As shown in FIG. 17, which is a cross-sectional view passing through the line XVII-XVII of FIG. 10, FIG. 12, and other figures, the fifth rib 51*e* and the sixth rib 51*f* extend from the upper end to the lower end of the peripheral wall 31.

(Flange)

The spacer 30 includes a plurality of flanges in addition to the intermediate flange 35*a*.

The spacer 30 includes a pair of second flanges 42 that constitutes a part of an opening edge above the second guide element 39 (intake side and exhaust side second through holes 39*i* and 39*e*) and the upper peripheral wall 32. Each second flange 42 extends from the front end to the rear end (more accurately, a position slightly backward of the rear end) of the second guide element 39. As shown in FIG. 6, the second flange 42 extends from a vicinity of the block outer peripheral wall 10 to a vicinity of the block inner peripheral wall 2E in top view. The second flange 42 covers almost the entire upper part of the clearance between the block outer peripheral wall 10 and the block inner peripheral wall 2E in a region where the second guide element 39 are formed.

The spacer 30 includes a pair of first flanges 41 each protruding outward (toward the block outer peripheral wall 10) from the upper end of a part where the first guide element 38 (intake side and exhaust side first through holes 38*i* and 38*e*) are formed in the upper peripheral wall 32. Each first flange 41 extends over the entire first guide element 38 in a front-to-back direction. In other words, the first flange 41 is formed to extend in a front-to-back direction from a position corresponding to the rear edge of the front peripheral wall 140 to a position corresponding to the front edge of the central peripheral wall 130.

The spacer 30 includes a third flange 43 protruding outward (toward the block outer peripheral wall 10) from the upper end of the front peripheral wall 140. In top view, the third flange 43 is formed to extend forward and on the intake side from the same position as the rear end of the coolant-introducing hole 15, and to reach the same position as the front end of the intake side first through hole 38*i*.

The first flange 41 of the intake side corresponding to the intake side first through hole 38*i* extends backward continuously from the rear end of the intake side of the third flange 43. The first flange 41 of the exhaust side corresponding to the exhaust side first through hole 38*e* extends backward from a position slightly apart backward of the rear end of the exhaust side of the third flange 43.

In this way, in the present embodiment, the flanges are provided protruding outward substantially over the entire circumference of the upper end of the peripheral wall 31 surrounding the first cylinder 2a. As shown in FIG. 6 and other figures, the flanges (first flange 41 and third flange 43) extend as a whole to the vicinity of the block outer peripheral wall 10. Thus, almost the entire upper part of the space between the peripheral wall 31 (front peripheral wall 140) surrounding the front part of the first cylinder 2a and the block outer peripheral wall 10 is covered with the flanges.

Here, as described above, the bulging part 18 is formed at the front end of each of the exhaust side wall 11 and the intake side wall 12. Correspondingly, in the present embodiment, the end of the exhaust side at the front end of the third flange 43 is curved to be recessed inward along the bulging part (hereinafter referred to as an exhaust side first bulging part as appropriate) 18e of the front end of the exhaust side wall 11 in top view, and has a shape surrounding the exhaust side first bulging part 18e. Meanwhile, the end of the intake side at the front end of the third flange 43 is curved to be recessed inward along the bulging part (hereinafter referred to as an intake side first bulging part as appropriate) 18i of the front end of the intake side wall 12 in top view, and has a shape surrounding the intake side first bulging part 18i.

In the front part of the third flange 43, that is, on an upper surface of the part of the third flange 43 extending in a right-to-left direction along the front side wall 13, a plurality of regulating parts 43a protruding upward is provided. The regulating parts 43a are arranged to extend in parallel in a front-to-back direction and arranged at almost equal intervals in a right-to-left direction. The regulating parts 43a extend over the entire front-to-back direction of the upper front surface of the third flange 43.

As shown in FIG. 9 and other figures, the spacer 30 includes a fourth flange 44 extending in an up-and-down direction and protruding backward from the rear end of the upper peripheral wall 32. The fourth flange 44 extends from the upper end of the upper peripheral wall 32 to the intermediate flange 35a.

As shown in FIG. 9 and other figures, the spacer 30 includes a fifth flange 45 and a sixth flange 46 extending in the circumferential direction of the peripheral wall 31. The sixth flange 46 is a flange protruding outward (toward the block outer peripheral wall 10) from the lower end of the peripheral wall 31. The fifth flange 45 is a flange protruding outward from a position slightly above the lower end of the peripheral wall 31. The fifth and sixth flanges 45 and 46 are provided over the entire circumference of the peripheral wall 31.

As shown in FIGS. 11, 15, and other figures, the spacer 30 includes a first regulating flange 47 protruding outward from the outer peripheral surface of the intake side of a part of the lower peripheral wall 33 surrounding the second cylinder 2b. The first regulating flange 47 extends in an up-and-down direction between the intermediate flange 35a and the fifth flange 45. The first block side outlet hole 16 is provided at a position facing the lower peripheral wall 33. The first regulating flange 47 is provided backward of the first block side outlet hole 16.

As shown in FIGS. 10, 15, and other figures, the spacer 30 includes a second regulating flange 48 protruding outward from the outer peripheral surface of the exhaust side of a part of the lower peripheral wall 33 surrounding the fourth cylinder 2d. The second regulating flange 48 extends in an up-and-down direction between the intermediate flange 35a and the fifth flange 45. The second block side outlet hole 17 is provided at a position facing the lower peripheral wall 33. The second regulating flange 48 is provided backward of the second block side outlet hole 17.

Furthermore, as shown in FIGS. 9, 12, and other figures, the spacer 30 includes reinforcing ribs 52 each extending in an up-and-down direction at a part of the upper peripheral wall 32 facing each inter-bore part 2f and protruding outward from the outer peripheral surface of the upper peripheral wall 32. Each reinforcing rib 52 extends from a vicinity of the upper end of the upper peripheral wall 32 to the intermediate flange 35a.

(4) Flow of the Coolant in the Water Jacket

Figure 18:
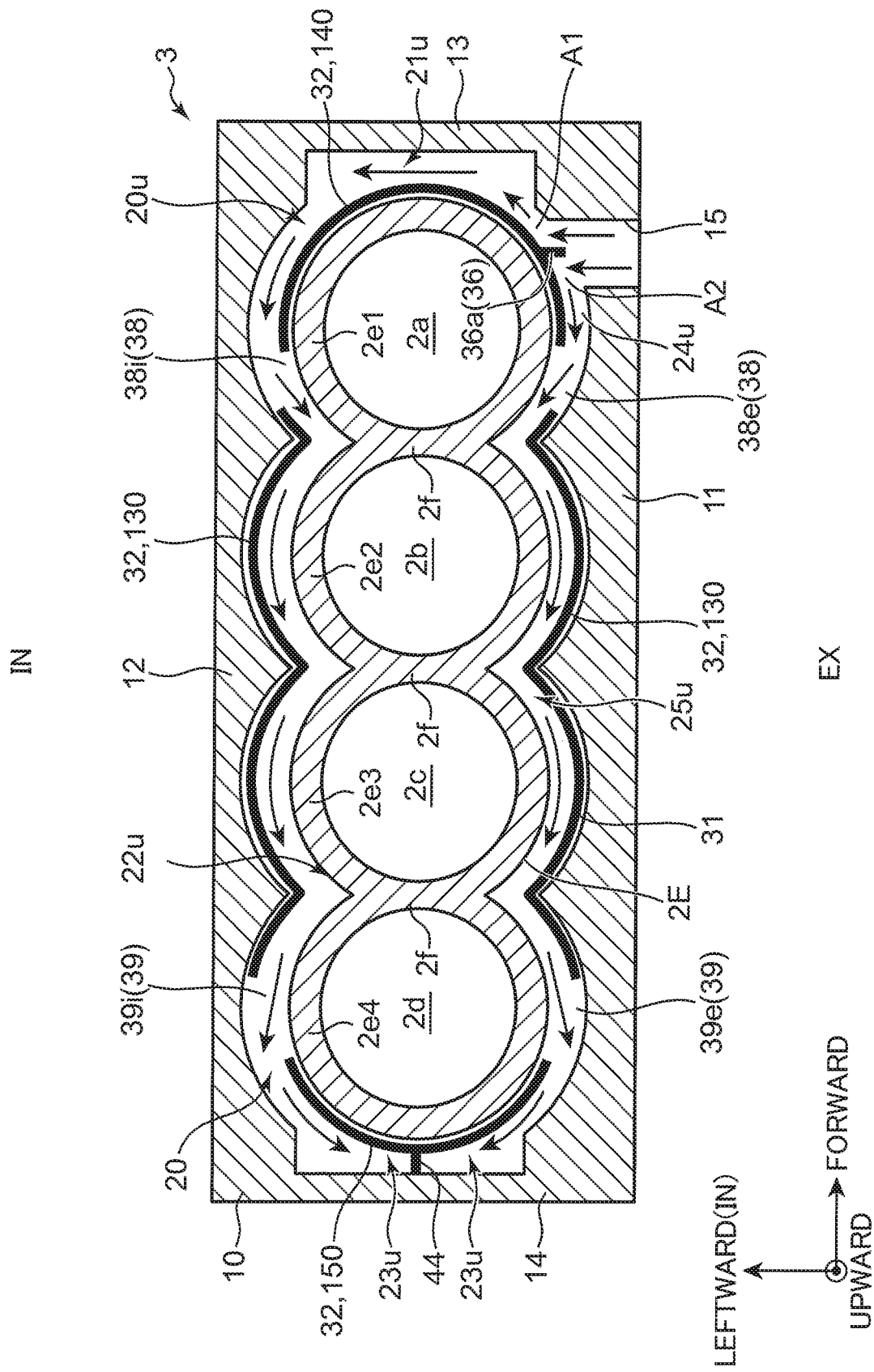
FIG. 18 is a diagram schematically showing a flow of a coolant in an upper region of a water jacket.
Figure 19:
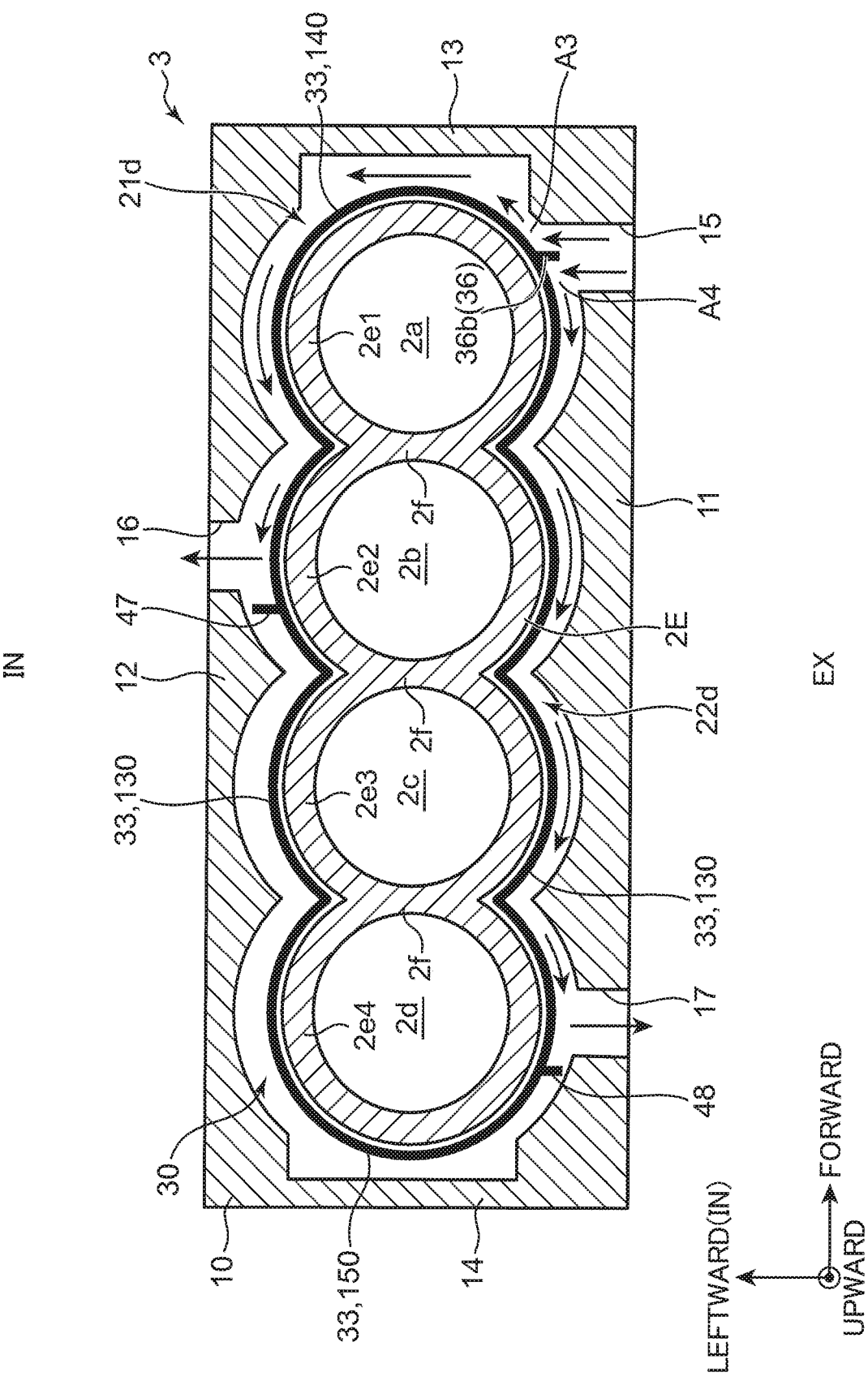
FIG. 19 is a diagram schematically showing the flow of the coolant in a lower region of the water jacket.

A flow of the coolant in the water jacket 20 will be described. FIG. 18 is a diagram schematically showing the flow in the upper region of the water jacket 20 (space above the dividing wall 35 in the water jacket 20). FIG. 19 is a diagram schematically showing the flow in the lower region of the water jacket 20 (space below the dividing wall 35 in the water jacket 20).

The coolant discharged from the water pump 60 is introduced into the water jacket 20 through the coolant-introducing hole 15. At this time, the coolant flows separately into each of the first inflow part A1 to the fourth inflow part A4. The coolant having flowed into each of the inflow parts A1 to A4 flows as follows.

(Coolant Having Flowed into the First Inflow Part A1 and the Second Inflow Part A2)

The coolant having flowed into the first inflow part A1 formed above the intermediate flange 35a and forward of the distribution wall 36 circulates through the upper region of the water jacket 20.

That is, the coolant having flowed into the first inflow part A1 first passes through a part of the passage defined between the peripheral wall 31 above the intermediate flange 35a (upper peripheral wall 32) and the block outer peripheral wall 10, i.e., through a part from the coolant-introducing hole 15 to the intake side first through hole 38i via the front side of the front end of the upper peripheral wall 32 (hereinafter referred to as a first upper passage 21u as appropriate), and then moves to the intake side first through hole 38i.

In the intake side first through hole 38i, the intermediate flange 35a and the step 35b are connected to each other. In the region backward of the intake side first through hole 38i, the space inside the peripheral wall 31 is vertically divided by the step 35b. The upper space of this region (space above the step 35b) is divided by the upper peripheral wall 32 of the central peripheral wall 130 such that the flow channel area is larger in the inside than in the outside. With this configuration, most of the coolant that has reached the intake side first through hole 38i flows into an inner passage above the step 35b and having a larger flow channel area, that is, a passage defined between the intake side part of the upper peripheral wall 32 of the central peripheral wall 130 and the block inner peripheral wall 2E (hereinafter referred to as a second upper passage 22u as appropriate). Then, the coolant moves backward in the second upper passage 22u and moves to the intake side second through hole 39i.

In the intake side second through hole 39i, the step 35b and the intermediate flange 35a are connected to each other. In the region backward of the intake side second through hole 39i, the space outside the peripheral wall 31 is divided vertically by the intermediate flange 35a. The upper space of this region (space above the intermediate flange 35a) is divided by the rear peripheral wall 150 such that the flow channel area is larger in the outside than in the inside. With this configuration, most of the coolant that has reached the intake side second through hole 39i flows into an outer passage above the intermediate flange 35a and having a larger flow channel area, that is, a passage defined between the upper peripheral wall 32 of the rear peripheral wall 150 and the block outer peripheral wall 10 (hereinafter referred to as a third upper passage 23u as appropriate). The third upper passage 23u communicates with the first head side jacket 4a, and the coolant that has reached the third upper passage 23u flows into the first head side jacket 4a.

The coolant having flowed into the second inflow part A2 formed above the intermediate flange 35a and backward of the distribution wall 36 circulates through the upper region of the water jacket 20.

That is, the coolant having flowed into the second inflow part A2 first passes through a part of the passage defined between the peripheral wall 31 above the intermediate flange 35a (upper peripheral wall 32) and the block outer peripheral wall 10, i.e., through a part extending backward from the second inflow part A2 to the exhaust side first through hole 38e (hereinafter referred to as a fourth upper passage 24u as appropriate), and then moves to the exhaust side first through hole 38e.

In the exhaust side first through hole 38e, the intermediate flange 35a and the step 35b are connected to each other. In the region backward of the exhaust side first through hole 38e, the space inside the peripheral wall 31 is vertically divided by the step 35b. The upper space of this region (space above the step 35b) is divided by the upper peripheral wall 32 of the central peripheral wall 130 such that the flow channel area is larger in the inside than in the outside. With this configuration, in a similar manner to the intake side, most of the coolant that has reached the exhaust side first through hole 38e flows into an inner passage above the step 35b and having a larger flow channel area, that is, a passage defined between the exhaust side part of the upper peripheral wall 32 of the central peripheral wall 130 and the block inner peripheral wall 2E (hereinafter referred to as a fifth upper passage 25u as appropriate). Then, the coolant moves backward in the fifth upper passage 25u and reaches the exhaust side second through hole 39e.

In a similar manner to the intake side, most of the coolant that has reached the exhaust side second through hole 39e flows into an outer passage having a relatively large flow channel area, that is, the third upper passage 23u, and then flows into the first head side jacket 4a.

Not that the third upper passage 23u is divided into the intake side and the exhaust side by the fourth flange 44. Therefore, the coolant flowing from the first inflow part A1 changes its direction at an intake side part of the fourth flange 44 in the third upper passage 23u, and flows into the first head side jacket 4a. Meanwhile, the coolant flowing from the second inflow part A2 changes its direction at an exhaust side part of the fourth flange 44 in the third upper passage 23u, and flows into the first head side jacket 4a.

In this way, the coolant having flowed into the first inflow part A1 and the second inflow part A2 passes through the passage along the upper peripheral wall 32, that is, the passage defined above the dividing wall 35 in the water jacket 20, and is introduced into the first head side jacket 4a. In other words, the first to fifth upper passages 21u to 25u and the guide elements 38 and 39 through which the coolant having flowed into the first inflow part A1 and the second inflow part A2 passes constitute a part of the main passage L10. Hereinafter, as appropriate, the space defined above the dividing wall 35 in the water jacket 20 is referred to as an upper passage 20u.

As described above, the coolant circulating through the upper passage 20u passes outside the peripheral wall 31 in parts along the front peripheral wall 140 and the rear peripheral wall 150. In a part along the central peripheral wall 130, the coolant passes inside the peripheral wall 31. Thus, the coolant does not come in direct contact with the upper part of each of the front part of the first cylinder wall 2e1 and the rear part of the fourth cylinder wall 2e4. Meanwhile, the coolant comes in direct contact with the upper part of each inter-bore part 2f and the upper parts of the second cylinder wall 2e2 and the third cylinder wall 2e3.

In addition, in the present embodiment, the third flange 43, the first rib 51a, and the fifth rib 51e ensure that direct contact between the front part of the first cylinder wall 2e1 and the coolant is avoided.

Specifically, in the vicinity of the first and second inflow parts A1 and A2, a part of the coolant flows upward following a collision against the front peripheral wall 140 facing the inflow parts A1 and A2. In contrast, in the present embodiment, as described above, the upper part of the space between the coolant-introducing hole 15 and the front peripheral wall 140 is covered with the third flange 43. Therefore, in the vicinity of the first and second inflow parts A1 and A2, the coolant is prevented from going beyond the upper end of the front peripheral wall 140 and flowing into the inside of the front peripheral wall 140 (clearance between the front peripheral wall 140 and the first cylinder wall 2e1), and direct contact of the coolant with the front part of the first cylinder wall 2e1 is avoided.

In the first upper passage 21u along the front peripheral wall 140, since the flow channel area is reduced by the exhaust side first bulging part 18e and the intake side first bulging part 18i, the speed of the coolant having flowed vigorously from the coolant-introducing hole 15 into the first inflow part A1 is further increased when passing by the first bulging parts 18e and 18i. With this configuration, the flow of the coolant is turbulent on the downstream side of the first bulging parts 18e and 18i, and the flow direction of some of the coolant is upward. In contrast, in the present embodiment, also on the downstream side of the first bulging parts 18e and 18i, the upper part of the space between the front peripheral wall 140 and the block outer peripheral wall 10 is covered with the third flange 43. Therefore, it is avoided by the third flange 43 that the coolant goes beyond the upper end of the front peripheral wall 140 and flows into the inside of the front peripheral wall 140.

There is a possibility that a part of the coolant passes through the first guide element 38 (intake side first through hole 38i and exhaust side first through hole 38e) and then turns forward to enter the inside of the front peripheral wall 140. In contrast, in the present embodiment, the inner peripheral surface of the front peripheral wall 140 is divided in the circumferential direction by the first rib 51a and the fifth rib 51e. In other words, a configuration is employed in which the inner peripheral surface of the front peripheral wall 140 is not a continuous peripheral surface by providing the first rib 51a and the fifth rib 51e. Therefore, it is unlikely that a coolant flow along the inner peripheral surface of the front peripheral wall 140 is formed, and it is avoided that a part of the coolant having reached the first guide element 38 enters the inside of the front peripheral wall 140.

In the present embodiment, the sixth rib 51f ensures that direct contact between the rear part of the fourth cylinder wall 2e4 and the coolant is avoided.

Specifically, in a similar manner to the fifth rib 51e described above, the inner peripheral surface of the rear peripheral wall 150 is divided by the sixth rib 51f. With this configuration, it is unlikely that a coolant flow along the inner peripheral surface of the rear peripheral wall 150 is formed, and it is avoided that a part of the coolant having passed through the second guide element 39 enters the inside of the rear peripheral wall 150 to come into direct contact with the fourth cylinder wall 2e4.

Furthermore, in the present embodiment, it is avoided by the second to fourth ribs 51b to 51d provided on the lower peripheral wall 33 that the coolant circulating through the second upper passage 22u and the fifth upper passage 25u leaks below the step 35b.

Specifically, if the inner peripheral surface of the lower peripheral wall 33 is continuous, as shown by a broken line in FIG. 13, a downward flow is easily formed along the inner peripheral surface from the second upper passage 22u. This means that the coolant is likely to leak downward from the second upper passage 22u. In contrast, in the present embodiment, the lower peripheral wall 33 below the second upper passage 22u, that is, the inner peripheral surface of the lower peripheral wall 33 facing the intake side surface of the second to fourth cylinder walls 2e2 to 2e4 is divided by the second to fourth ribs 51b to 51d of the intake side. Therefore, it is avoided that the flow as described above is formed, that is, that the coolant in the second upper passage 22u leaks downward.

This also applies to the fifth upper passage 25u. That is, the inner peripheral surface of the lower peripheral wall 33 below the fifth upper passage 25u is divided by the second to fourth ribs 51b to 51d of the exhaust side. Therefore, it is avoided that a downward flow is formed along the inner peripheral surface, that is, that the coolant in the fifth upper passage 25u leaks downward.

(Coolant Having Flowed into the Third Inflow Part A3 and the Fourth Inflow Part A4)

The coolant having flowed into the third inflow part A3 formed below the intermediate flange 35a and forward of the distribution wall 36 circulates through the lower region of the water jacket 20.

That is, the coolant having flowed into the third inflow part A3 passes through the passage defined between the peripheral wall 31 below the intermediate flange 35a (lower peripheral wall 33) and the block outer peripheral wall 10, moves forward from the third inflow part A3, and then wraps around to the intake side. The coolant having wrapped around to the intake side passes through the passage defined between the lower peripheral wall 33 on the intake side and the block outer peripheral wall 10, and moves backward. As described above, the first regulating flange 47 is provided backward of the first block side outlet hole 16 on the intake side surface of the lower peripheral wall 33. Therefore, the first regulating flange 47 regulates movement of the coolant backward of the first regulating flange 47, and the coolant is introduced into the first block side outlet hole 16. Then, the coolant passes through the first block side outlet hole 16 and is led out of the water jacket 20.

In this way, the coolant having flowed into the third inflow part A3 passes through a part of the lower region of the water jacket 20, and is led out to the first block side outlet hole 16. The passage for the coolant, that is, a passage from the third inflow part A3 to the first regulating flange 47 through the front side of the front end of the lower peripheral wall 33 in the space between the lower peripheral wall 33 and the block outer peripheral wall 10 (hereafter referred to as a first lower passage 21d as appropriate) constitutes part of the first auxiliary passage L20.

The coolant having flowed into the fourth inflow part A4 formed below the intermediate flange 35a and backward of the distribution wall 36 circulates through the lower region of the water jacket 20.

That is, the coolant having flowed into the fourth inflow part A4 passes through the passage defined between the peripheral wall 31 below the intermediate flange 35a (lower peripheral wall 33) and the block outer peripheral wall 10, and moves backward. As described above, the second regulating flange 48 is provided at a position backward of the second block side outlet hole 17 on the exhaust side surface of the lower peripheral wall 33. Therefore, the second regulating flange 48 regulates movement of the coolant backward of the second regulating flange 48, and the coolant is introduced into the second block side outlet hole 17. Then, the coolant passes through the second block side outlet hole 17 and is led out of the water jacket 20.

In this way, the coolant having flowed into the fourth inflow part A4 passes through a part of the lower region of the water jacket 20, and is led out to the second block side outlet hole 17. The passage for the coolant, that is, a passage from the fourth inflow part A4 to the second regulating flange 48 through the exhaust side of the lower peripheral wall 33 in the space between the lower peripheral wall 33 and the block outer peripheral wall 10, (hereafter referred to as a second lower passage 22d as appropriate) constitutes part of the second auxiliary passage L30.

Note that in the present embodiment, the first lower passage 21d and the second lower passage 22d correspond to the "lower passage" of the claims.

(5) Effects and the Like

As described above, in the present embodiment, the spacer 30 including the peripheral wall 31 and the dividing wall 35 is housed in the water jacket 20 through which the coolant circulates. Therefore, the water jacket 20 is divided into the upper passage 20u and the lower passages 21d and 22d below the upper passage 20u. The upper passage 20u constitutes a part of the main passage L10, and causes the coolant to circulate such that the coolant comes in direct contact with the second cylinder wall 2e2, the third cylinder wall 2e3, and a plurality of (three) inter-bore parts 2f. The lower passages 21d and 22d constitute parts of the first auxiliary passage L20 and the second auxiliary passage L30, respectively, and cause the coolant to circulate such that the coolant does not come in direct contact with the first to fourth cylinder walls 2e1 to 2e4. The coolant led out from the first lower passage 21d through the first block side outlet hole 16 is introduced into the oil cooler 63. The coolant led out from the second lower passage 22d through the second block side outlet hole 17 is introduced into the EGR cooler 64.

With the above configuration, in the present embodiment, the water jacket 20 in the cylinder block 3 can be effectively used as a passage for introducing the coolant into each of the coolers 63 and 64. In addition, the flow rate of the coolant circulating through the upper passage 20u and the flow rate of the coolant introduced into the coolers 63 and 64 can be individually changed. With this configuration, while the temperature of the combustion chamber of each of the cylinders 2a to 2d is adjusted to an appropriate temperature by adjusting the flow rate of the coolant that circulates through the upper passage 20u and passes through each inter-bore part 2f, the cooling capacity of each of the coolers 63 and 64 can be adjusted appropriately by adjusting the flow rate of the relatively low-temperature coolant introduced from the lower passages 21d and 22d into the coolers 63 and 64, respectively.

In the present embodiment, the main switching device TS1 that can be opened and closed is provided in the main passage L10 (radiator outlet passage L12) through which the coolant led out from the upper passage 20u circulates. Therefore, the flow rate of the coolant that cools the second cylinder wall 2e2, the third cylinder wall 2e3, and the inter-bore part 2f can be appropriately changed by the main switching device TS1, and the temperature of the combustion chamber of each of the cylinders 2a to 2d can be adjusted to an appropriate temperature.

The first auxiliary switching device TS2 that can be opened and closed is provided in the first auxiliary passage L20 (ATF warmer introduction passage L21) through which the coolant led out from the first lower passage 21d circulates. Therefore, the first auxiliary switching device TS2 can appropriately change the flow rate of the coolant introduced into the ATF warmer 62 and the oil cooler 63 provided in the first auxiliary passage L20, and can adjust the temperatures of the ATF and the lubricant to appropriate temperatures.

The second auxiliary switching device SV1 that can be opened and closed is provided in the second auxiliary passage L30 (head outlet passage L34) through which the coolant led out from the second lower passage 22d circulates. Therefore, the second auxiliary switching device SV1 can appropriately change the flow rate of the coolant introduced into the EGR cooler 64 and the heater 65 provided in the second auxiliary passage L30, and can adjust the temperature of the EGR gas and the air conditioning temperature (temperature of the air introduced into the vehicle interior) to appropriate temperatures. In particular, in the present embodiment, the second auxiliary switching device SV1 includes a solenoid valve with an opening degree switchable among a fully closed position, a fully open position, and an intermediate opening degree between the fully closed position and the fully opened position. Therefore, the temperature of the EGR gas and the air conditioning temperature can be adjusted more accurately.

In the present embodiment, by using the lower passages 21d and 22d as passages for introducing the coolant into the oil cooler 63 and the EGR cooler 64, respectively, the coolant having a relatively low and stable temperature can be introduced into the coolers 63 and 64. That is, the lower passages 21d and 22d are provided at positions relatively far from the combustion chambers. The coolant circulating through the lower passages 21d and 22d does not come in direct contact with the block inner peripheral wall 2E (first to fourth cylinder walls 2e1 to 2e4). Therefore, the coolant circulating through the lower passages 21d and 22d is unlikely to be affected by the combustion chambers or the block inner peripheral wall 2E, and the temperature is maintained at a relatively low temperature. Therefore, by introducing such a coolant into the oil cooler 63 and the EGR cooler 64, the lubricant and the EGR gas can be reliably cooled in the coolers 63 and 64, and temperature fluctuation of the lubricant and the EGR gas can be suppressed.

Furthermore, in the present embodiment, the upper passage 20u causes the coolant to circulate such that the coolant comes in direct contact with upper parts of the second cylinder wall 2e2, the third cylinder wall 2e3, and the inter-bore part 2f, and that the coolant does not come in direct contact with the front part of the first cylinder wall 2e1 and the rear part of the fourth cylinder wall 2e4. The lower passages 21d and 22d cause the coolant to circulate such that the coolant does not come in direct contact with lower parts of the first to fourth cylinder walls 2e1 to 2e4. This makes it possible to implement appropriate cooling according to temperature conditions of the first to fourth cylinders 2a to 2d.

That is, since there are other cylinders on both sides of the second cylinder 2b, a wall part corresponding to the second cylinder 2b in the block inner peripheral wall 2E, that is, the second cylinder wall 2e2 is likely to reach a high temperature. Similarly, since there are other cylinders on both sides of the third cylinder 2c, a wall part corresponding to the third cylinder 2c in the block inner peripheral wall 2E, that is, the third cylinder wall 2e3 is likely to reach a high temperature. Moreover, the inter-bore part 2f, which receives combustion energy from the two cylinders, is likely to reach a high temperature. In particular, upper parts of the second cylinder wall 2e2, the third cylinder wall 2e3, and the inter-bore part 2f, which are close to the combustion chambers, are likely to reach a higher temperature. In the present embodiment, such a part that is likely to reach a high temperature can be reliably cooled by direct contact with the coolant.

Meanwhile, the coolant does not come in direct contact with other parts that are unlikely to reach a high temperature, specifically, the front part of the first cylinder wall 2e1, the rear part of the fourth cylinder wall 2e4, and lower parts of the first to fourth cylinder walls 2e1 to 2e4, making it possible to avoid excessive cooling of the parts that are unlikely to reach a high temperature. In particular, in the present embodiment, auto-ignition combustion is performed in the combustion chambers. Therefore, there is a possibility that, if the block inner peripheral wall 2E (first to fourth cylinder walls 2e1 to 2e4) is excessively cooled, the temperature in the combustion chambers becomes too low and auto-ignition combustion is not stabilized. In contrast, according to the present embodiment that can avoid the block inner peripheral wall 2E from being excessively cooled, the stability of auto-ignition combustion can be increased.

(6) Modification

The embodiment has described a case where the cooler connected to the lower passages 21d and 22d includes the oil cooler 63 and the EGR cooler 64, respectively. However, the cooler connected to the lower passages 21d and 22d is not limited to the oil cooler 63 and the EGR cooler 64 as long as the coolers cool some cooling object by using the coolant.

The embodiment has described a case where auto-ignition combustion is performed in the combustion chambers, but the combustion mode performed in the combustion chambers is not limited to this case.

(7) Conclusion

The embodiment and the modification described above are summarized as follows.

An engine cooling structure is a structure for cooling an engine body including a plurality of cylinders by using a coolant, and includes: a cylinder block including: a block inner peripheral wall defining the plurality of cylinders; and a block outer peripheral wall surrounding the block inner peripheral wall to define a water jacket through which the coolant circulates between the block outer peripheral wall and the block inner peripheral wall; a spacer housed in the water jacket; and a cooler provided outside the engine body. The block outer peripheral wall includes: a coolant inlet configured to introduce the coolant into the water jacket; and a coolant exit configured to lead out the coolant from the water jacket to the cooler. The block inner peripheral wall includes an inter-bore part positioned between the adjacent cylinders. The spacer includes: a peripheral wall surrounding the block inner peripheral wall; and a dividing wall protruding from the peripheral wall to divide the water jacket into an upper passage and a lower passage below the upper passage. The coolant inlet is provided at a position to introduce the coolant into the upper passage, and the upper passage allows the coolant introduced from the coolant inlet to pass through the inter-bore part. The coolant exit is provided at a position to lead out the coolant in the lower passage to the cooler, and the cooler cools a predetermined cooling object by the coolant led out from the coolant exit.

In the cooling structure, the water jacket formed in the cylinder block is divided by the spacer into the upper passage and the lower passage. This makes it possible to individually change the flow rate of the coolant circulating through the upper passage and the flow rate of the coolant circulating through the lower passage. The coolant circulating through the upper passage passes through the inter-bore part, and the coolant circulating through the lower passage is introduced into the cooler. Therefore, the cooling object can be appropriately cooled in the cooler while adjusting the temperature of the combustion chamber of each cylinder to an appropriate temperature by adjusting the flow rate of the coolant circulating through the upper passage.

Specifically, the inter-bore part is likely to reach a high temperature by receiving combustion energy of the adjacent cylinders, and the temperature of the inter-bore part has a great effect on the temperature of the combustion chamber. The upper passage is closer to the combustion chamber than the lower passage, and the flow rate of the coolant circulating through the upper passage has a greater effect on the temperature of the combustion chamber than the flow rate of the coolant in the lower passage. Therefore, the temperature of the combustion chamber can be adjusted to an appropriate temperature by adjusting the flow rate of the coolant circulating through the upper passage. Since the coolant circulating through the lower passage positioned below the upper passage is introduced into the cooler, the flow rate adjustment of the coolant in the upper passage can reduce the effect on the amount of coolant introduced into the cooler, and an appropriate amount of coolant can be introduced into the cooler. The lower part of the block inner peripheral wall, which is far from the combustion chamber, is unlikely to reach a high temperature. The coolant circulating through the lower passage is maintained at a relatively low temperature. Therefore, by introducing the coolant having a relatively low temperature into the cooler, the cooling object can be effectively cooled in the cooler.

In the cooling structure, preferably, the coolant exit includes a first exit and a second exit provided at different positions on the block outer peripheral wall, the cooler includes a first cooler and a second cooler that cool different cooling objects, the first exit leads out the coolant in the lower passage to the first cooler, and the second exit leads out the coolant in the lower passage to the second cooler.

With this configuration, it is possible to effectively cool the cooling objects in the first cooler and the second cooler.

In the structure, more preferably, the cooling structure further includes: a water pump configured to discharge the coolant to the coolant inlet; and a first passage connecting the water pump and the first exit outside the cylinder block. The first cooler is an EGR cooler that cools an EGR gas that is an exhaust gas recirculated to an intake air to be introduced into the engine body out of an exhaust gas discharged from the engine body. The EGR cooler and a first flow regulating device are provided in the first passage, the first flow regulating device being configured to change a flow rate of the coolant that circulates through the first passage.

With this configuration, the EGR gas can be appropriately cooled while appropriately adjusting the temperature of the combustion chamber of each cylinder. In particular, since the flow rate of the coolant introduced into the EGR cooler is changed by the first flow regulating device, the temperature of the EGR gas can be adjusted accurately.

In the structure, more preferably, the first flow regulating device includes a first valve provided in an openable and closable manner in the first passage, and is configured to switch an opening degree of the first valve among a fully closed position, a fully open position, and an intermediate opening degree between the fully closed position and the fully open position.

With this configuration, the flow rate of the coolant introduced into the EGR cooler can be finely changed, and the temperature of the EGR gas can be adjusted more accurately.

Preferably, the cooling structure further includes a second passage connecting the water pump and the second exit outside the cylinder block. The second cooler is an oil cooler that cools a lubricant supplied to the engine body. The oil cooler and a second flow regulating device are provided in the second passage, the second flow regulating device being configured to change a flow rate of the coolant that circulates through the second passage.

With this configuration, the lubricant can be appropriately cooled while appropriately adjusting the temperature of the combustion chamber of each cylinder. In particular, since the second flow regulating device changes the flow rate of the coolant introduced into the oil cooler, the temperature of the lubricant can be adjusted accurately.

In the structure, more preferably, the second flow regulating device includes a second valve provided in an openable and closable manner in the second passage, when a temperature of the coolant circulating through the second passage is equal to or higher than a predetermined temperature, the second flow regulating device fully opens the second valve, and when the temperature of the coolant is lower than the predetermined temperature, the second flow regulating device fully closes the second valve.

With this configuration, the lubricant can be appropriately cooled while simplifying the structure of the second flow regulating device.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. An engine cooling structure for cooling an engine body including a plurality of cylinders by using a coolant, the engine cooling structure comprising:
   a cylinder block including: a block inner peripheral wall defining the plurality of cylinders; and a block outer peripheral wall surrounding the block inner peripheral wall to define a water jacket through which the coolant circulates between the block outer peripheral wall and the block inner peripheral wall;
   a spacer housed in the water jacket; and
   a cooler provided outside the engine body,
   wherein the block outer peripheral wall includes: a coolant inlet configured to introduce the coolant into the water jacket; and a coolant exit configured to lead out the coolant from the water jacket to the cooler,
   the block inner peripheral wall includes an inter-bore part positioned between adjacent cylinders of the plurality of cylinders,
   the spacer includes: a peripheral wall surrounding the block inner peripheral wall; and a dividing wall protruding from the peripheral wall to divide the water jacket into an upper passage and a lower passage below the upper passage, the peripheral wall includes an upper peripheral wall above the dividing wall, and a lower peripheral wall below the dividing wall, the coolant inlet is provided at a position to introduce the coolant into the upper passage, the upper passage allows the coolant introduced from the coolant inlet to come in direct contact with the inter-bore part, the coolant exit is provided at a position facing the lower peripheral wall of the spacer under the dividing wall so as to lead out the coolant in the lower passage to the cooler, and the cooler cools a predetermined cooling object by the coolant led out from the coolant exit.

2. The engine cooling structure according to claim 1, wherein the coolant exit includes a first exit and a second exit provided at different positions on the block outer peripheral wall, the cooler includes a first cooler and a second cooler that cool different cooling objects, the first exit leads out the coolant in the lower passage to the first cooler, and the second exit leads out the coolant in the lower passage to the second cooler.

3. The engine cooling structure according to claim 2, further comprising:

a water pump configured to discharge the coolant to the coolant inlet; and a first passage connecting the water pump and the first exit outside the cylinder block, wherein the first cooler is an EGR cooler that cools an EGR gas that is an exhaust gas recirculated to an intake air to be introduced into the engine body out of an exhaust gas discharged from the engine body, and the EGR cooler and a first flow regulating device are provided in the first passage, the first flow regulating device being configured to change a flow rate of the coolant that circulates through the first passage.

4. The engine cooling structure according to claim 3, wherein the first flow regulating device includes a first valve provided in an openable and closable manner in the first passage, and is configured to switch an opening degree of the first valve among a fully closed position, a fully open position, and an intermediate opening degree between the fully closed position and the fully open position.

5. The engine cooling structure according to claim 2, further comprising:

a water pump configured to discharge the coolant to the coolant inlet; and a second passage connecting the water pump and the second exit outside the cylinder block, wherein the second cooler is an oil cooler that cools a lubricant supplied to the engine body, and the oil cooler and a second flow regulating device are provided in the second passage, the second flow regulating device being configured to change a flow rate of the coolant that circulates through the second passage.

6. The engine cooling structure according to claim 5, wherein the second flow regulating device includes a second valve provided in an openable and closable manner in the second passage, when a temperature of the coolant circulating through the second passage is equal to or higher than a predetermined temperature, the second flow regulating device fully opens the second valve, and when the temperature of the coolant is lower than the predetermined temperature, the second flow regulating device fully closes the second valve.

7. The engine cooling structure according to claim 1, wherein the cooler includes an EGR (exhaust gas recirculation) cooler that cools an EGR gas that is an exhaust gas recirculated to an intake air to be introduced into the engine body out of an exhaust gas discharged from the engine body, and an oil cooler that cools a lubricant supplied to the engine body, the coolant exit includes a first exit formed in an exhaust side wall of the block outer peripheral wall, and a second exit formed in an intake side wall of the block outer peripheral wall, the first exit leads out the coolant in the lower passage to the EGR cooler, and the second exit leads out the coolant in the lower passage to the oil cooler.

8. An engine cooling structure for cooling an engine body including a plurality of cylinders by using a coolant, the engine cooling structure comprising:

a cylinder block including: a block inner peripheral wall defining the plurality of cylinders; and a block outer peripheral wall surrounding the block inner peripheral wall to define a water jacket through which the coolant circulates between the block outer peripheral wall and the block inner peripheral wall;

a spacer housed in the water jacket; and a cooler provided outside the engine body and including an EGR (exhaust gas recirculation) cooler that cools an EGR gas that is an exhaust gas recirculated to an intake air to be introduced into the engine body out of an exhaust gas discharged from the engine body, and an oil cooler that cools a lubricant supplied to the engine body, wherein the block outer peripheral wall includes: a coolant inlet configured to introduce the coolant into the water jacket; and a coolant exit configured to lead out the coolant from the water jacket to the cooler, the block inner peripheral wall includes an inter-bore part positioned between adjacent cylinders of the plurality of cylinders, the spacer includes: a peripheral wall surrounding the block inner peripheral wall; and a dividing wall protruding from the peripheral wall to divide the water jacket into an upper passage and a lower passage below the upper passage, the coolant inlet is provided at a position to introduce the coolant into the upper passage, the upper passage allows the coolant introduced from the coolant inlet to come in direct contact with the inter-bore part, the coolant exit is provided at a position to lead out the coolant in the lower passage to the cooler, the cooler cools a predetermined cooling object by the coolant led out from the coolant exit, the coolant exit includes a first exit formed in an exhaust side wall of the block outer peripheral wall, and a second exit formed in an intake side wall of the block outer peripheral wall, the first exit leads out the coolant in the lower passage to the EGR cooler, and the second exit leads out the coolant in the lower passage to the oil cooler.

* * * * *